(12) United States Patent
Higuchi et al.

(10) Patent No.: US 8,675,313 B2
(45) Date of Patent: Mar. 18, 2014

(54) SUSPENSION BOARD WITH CIRCUIT

(71) Applicant: Nitto Denko Corporation, Osaka (JP)

(72) Inventors: Naotaka Higuchi, Osaka (JP); Hitoki Kanagawa, Osaka (JP); Tetsuya Ohsawa, Osaka (JP); Daisuke Yamauchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/723,842

(22) Filed: Dec. 21, 2012

(65) Prior Publication Data

US 2013/0170076 A1 Jul. 4, 2013

Related U.S. Application Data

(60) Provisional application No. 61/632,068, filed on Jan. 18, 2012.

(30) Foreign Application Priority Data

Dec. 28, 2011 (JP) .................................. 2011-288198

(51) Int. Cl.
   *G11B 21/21* (2006.01)
   *G11B 5/60* (2006.01)

(52) U.S. Cl.
   USPC .................. 360/245.9; 360/294.1; 360/294.7

(58) Field of Classification Search
   USPC ........... 360/245.3, 245.7, 245.9, 294.1, 294.7
   See application file for complete search history.

(56) References Cited

U.S. PATENT DOCUMENTS

| | | | | |
|---|---|---|---|---|
| 4,868,694 A | * | 9/1989 | Hagen ........................ | 360/245.6 |
| 5,063,464 A | * | 11/1991 | Astheimer et al. ............ | 360/266 |
| 5,473,488 A | * | 12/1995 | Gustafson et al. ......... | 360/245.5 |
| 5,943,192 A | * | 8/1999 | Utsunomiya .............. | 360/245.5 |
| 6,597,539 B1 | * | 7/2003 | Stupp et al. ................ | 360/245.7 |
| 6,801,398 B1 | * | 10/2004 | Ohwe et al. ................ | 360/234.6 |
| 6,952,330 B1 | * | 10/2005 | Riddering et al. ......... | 360/294.7 |
| 7,239,485 B2 | * | 7/2007 | Boutaghou et al. ........ | 360/245.9 |
| 7,436,631 B1 | * | 10/2008 | Fanslau et al. ............. | 360/294.7 |
| 2002/0036870 A1 | | 3/2002 | Shiraishi et al. | |
| 2004/0095687 A1 | | 5/2004 | Shiraishi et al. | |
| 2004/0095688 A1 | | 5/2004 | Shiraishi et al. | |
| 2008/0137233 A1 | * | 6/2008 | Otsuki et al. .................. | 360/240 |
| 2009/0116142 A1 | * | 5/2009 | Hikosaka ................... | 360/97.02 |

FOREIGN PATENT DOCUMENTS

| | | | | |
|---|---|---|---|---|
| JP | 59177772 | A | * | 10/1984 |
| JP | 60055570 | A | * | 3/1985 |
| JP | 02054417 | A | * | 2/1990 |
| JP | 09147510 | A | * | 6/1997 |
| JP | 200274870 | A | | 3/2002 |
| JP | 2006172619 | A | * | 6/2006 |

* cited by examiner

*Primary Examiner* — Will J Klimowicz
(74) *Attorney, Agent, or Firm* — Jean C. Edwards, Esq.; Edwards Neils PLLC

(57) ABSTRACT

A suspension board with circuit includes a mounting portion for mounting thereon a slider, a supporting portion for supporting one end portion of the mounting portion, a facing portion facing the mounting portion to be spaced apart therefrom, and a driving portion provided between the mounting portion and the facing portion. The driving portion includes a heater; and an expansive portion which is thermally expanded by heat generated from the heater.

5 Claims, 24 Drawing Sheets

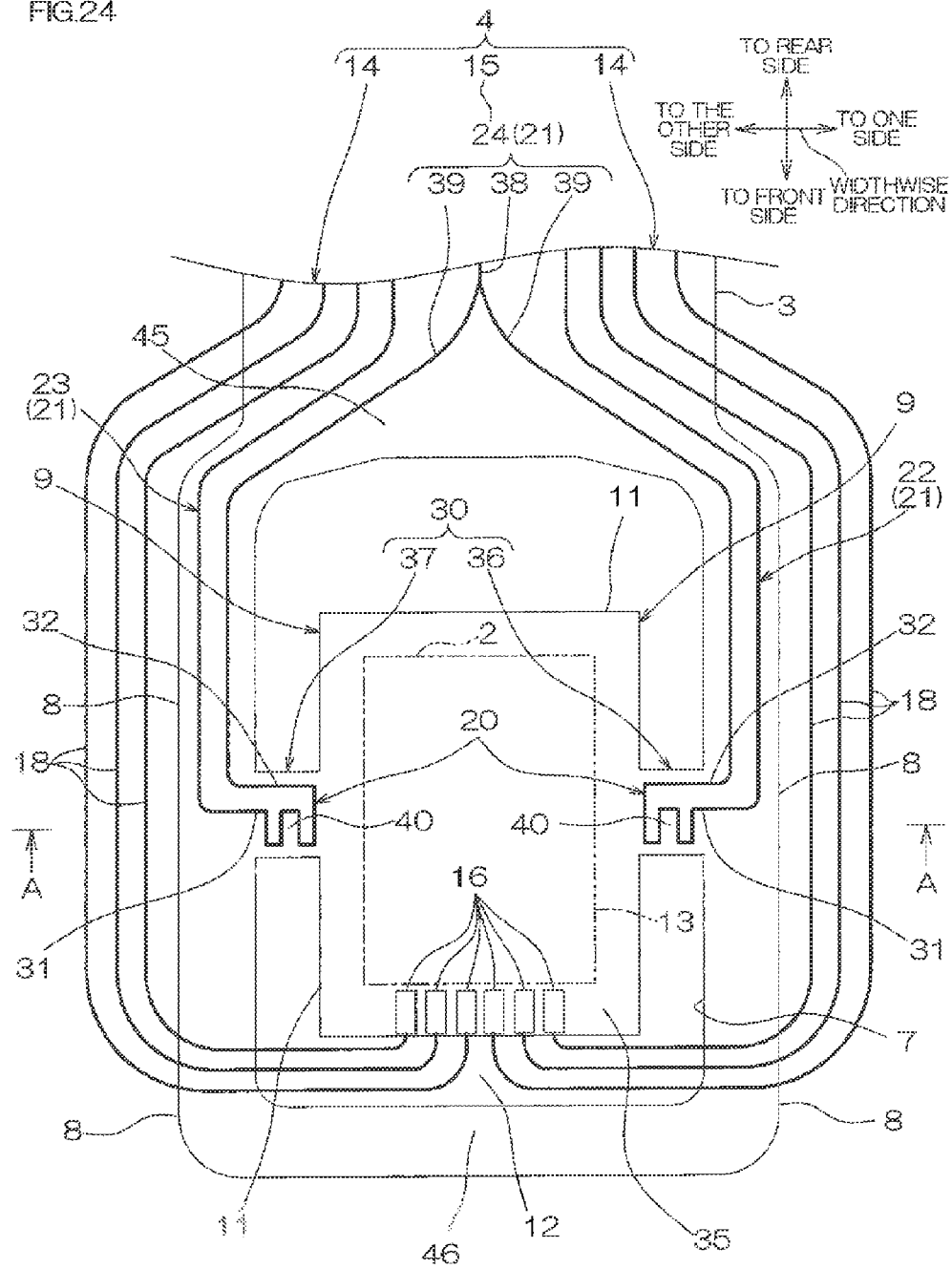

SUSPENSION BOARD WITH CIRCUIT

CROSS-REFERENCE TO RELATED APPLICATION

The present application claims the benefit of U.S. Provisional Application No. 61/632,068, filed on Jan. 18, 2012, and also claims priority from Japanese Patent Application No. 2011-288198 filed on Dec. 28, 2011, the contents of which are herein incorporated by reference into this application.

BACKGROUND OF THE INVENTION

1. Field of the Invention

The present invention relates to a suspension board with circuit, and particularly to a suspension board with circuit used in a hard disk drive.

2. Description of the Related Art

Conventionally, a suspension board with circuit on which a slider with a magnetic head mounted thereon is mounted is used in a hard disk drive.

In recent years, it has been proposed to mount various electronic elements on such a suspension board with circuit. Specific examples of such electronic elements include a microactuator having a piezo-element (piezoelectric element) for precisely and finely adjusting the position and angle of a magnetic head.

For example, a suspension has been proposed which includes a flexure and a U-shaped actuator provided on the front end portion thereof. The actuator includes a base portion fixedly attached to the flexure, a pair of arm members extending from the both ends of the base portion, and piezoelectric elements provided on the side surfaces of the arm members (see, e.g., Japanese Unexamined Patent Publication No. 2002-74870).

In the suspension proposed in Japanese Unexamined Patent Publication No. 2002-74870, a magnetic head slider is sandwiched between the front ends of the pair of arm members and, by the extension/contraction of the piezoelectric elements, the pair of arm members are swung to also swing the magnetic head slider.

SUMMARY OF THE INVENTION

However, the piezoelectric elements need a production step in which they are separately produced from the flexure and provided on the actuator as members different from the arm members. This leads to the problem of increased production cost.

In addition, the piezoelectric elements of Japanese Unexamined Patent Publication No. 2002-74870 are small and brittle, and therefore difficult to handle.

It is therefore an object of the present invention to provide a suspension board with circuit including a driving portion which can be easily provided to allow a reduction in production cost.

A suspension board with circuit of the present invention includes a mounting portion for mounting thereon a slider, a supporting portion for supporting one end portion of the mounting portion, a facing portion facing the mounting portion to be spaced apart therefrom, and a driving portion provided between the mounting portion and the facing portion, wherein the driving portion includes a heater, and an expansive portion which is thermally expanded by heat generated from the heater.

In the suspension board with circuit of the present invention, it is preferable that the facing portion includes two facing portions, and the driving portion further includes a first driving portion provided between one of the facing portions and the mounting portion, and a second driving portion provided between the other facing portion and the mounting portion.

It is preferable that the suspension board with circuit of the present invention further includes a first driving circuit for selectively driving either one of the first driving portion and the second driving portion.

It is also preferable that the suspension board with circuit of the present invention further includes a second driving circuit for driving both of the first driving portion and the second driving portion.

In the suspension board with circuit of the present invention, it is also preferable that the heater is formed in a meandering shape.

In the driving portion of the suspension board with circuit of the present invention, when a current is allowed to flow in the heater, the heater generates heat. Then, the expansive portion is thermally expanded by the heat generated from the heater.

Consequently, the other end portion of the mounting portion supported by the supporting portion moves around the one end portion of the mounting portion so as to go farther away from the facing portion.

That is, in the suspension board with circuit of the present invention, the driving portion is provided in advance in the suspension board with circuit. Therefore, it is possible to allow omission of the trouble of separately producing a piezoelectric element and disposing it, while allowing accurate and fine adjustment of the position and angle of a magnetic head mounted on the slider.

As a result, using the suspension board with circuit in which the driving portion is easily provided and which can be obtained at low production cost, the position and angle of the magnetic head can be accurately and finely adjusted.

BRIEF DESCRIPTION OF THE DRAWINGS

FIG. 24 shows a plan view of a gimbal portion in still another embodiment (a form in which a stage is directly supported on driving portions serving also as supporting portions) of the suspension board with circuit of the present invention.

DETAILED DESCRIPTION OF THE INVENTION

Figure 1:
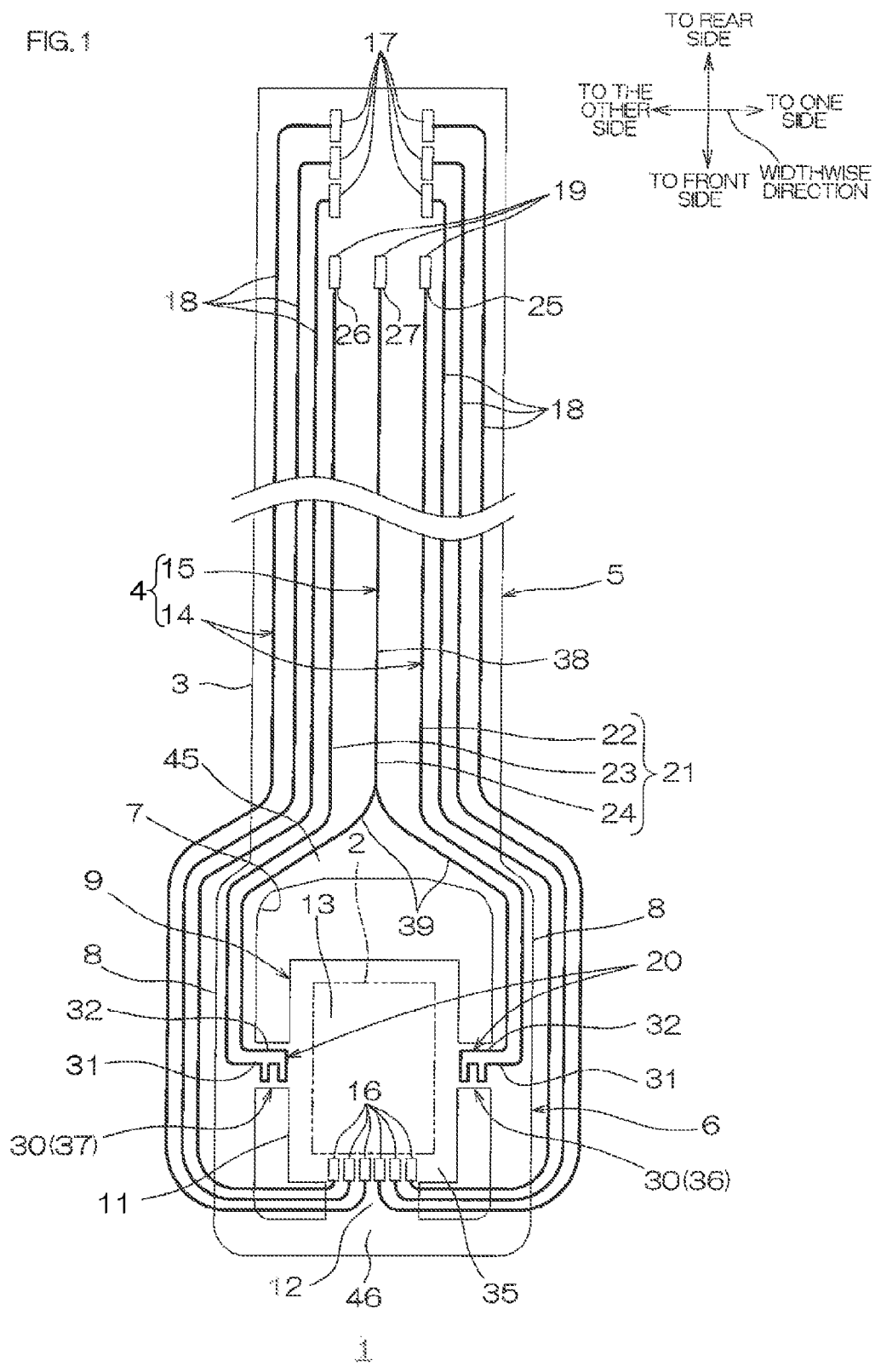
FIG. 1 shows a plan view of an embodiment of a suspension board with circuit of the present invention.
Figure 2:
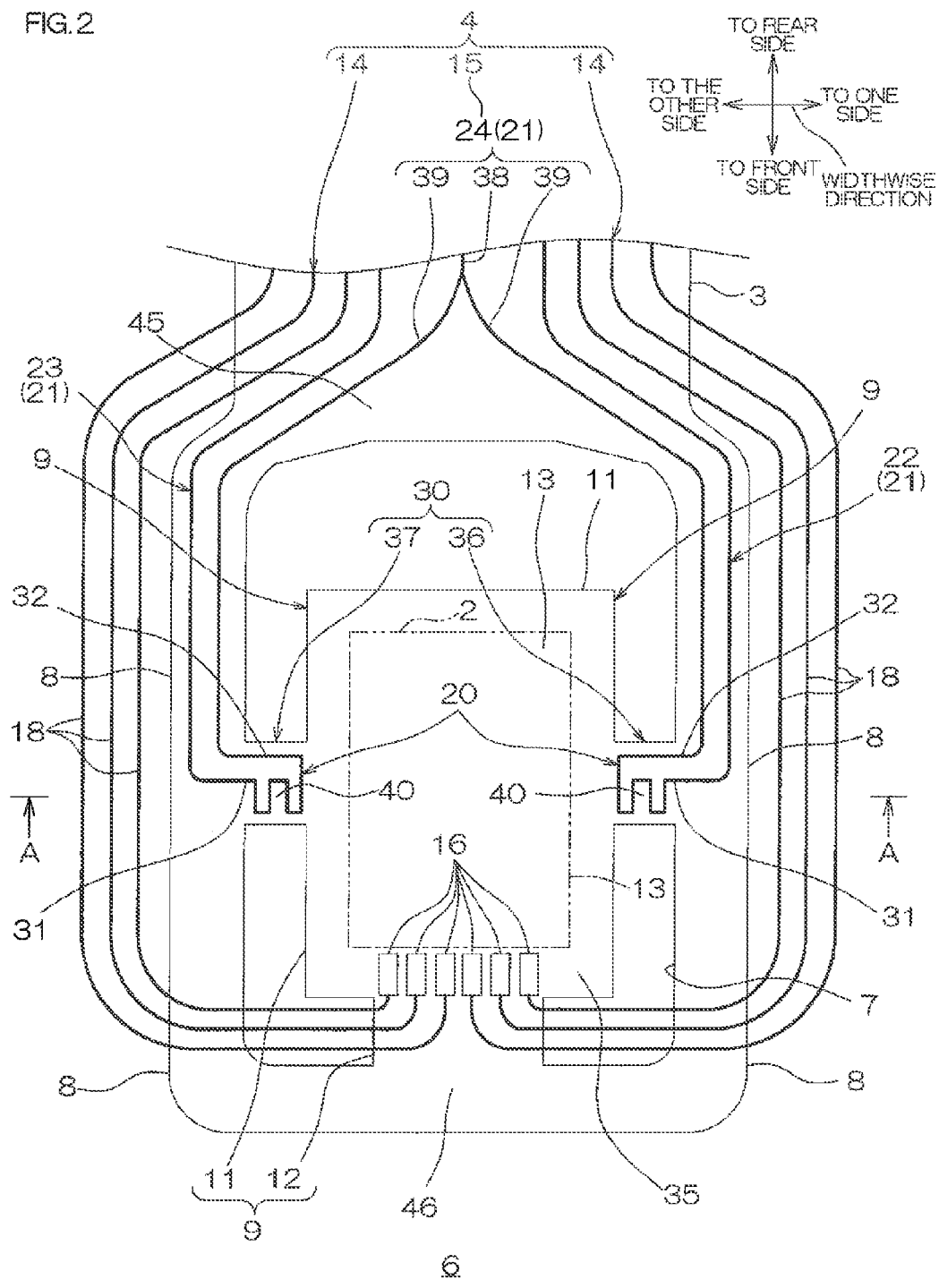
FIG. 2 shows an enlarged plan view of a gimbal portion in the suspension board with circuit shown in FIG. 1.
Figure 3:
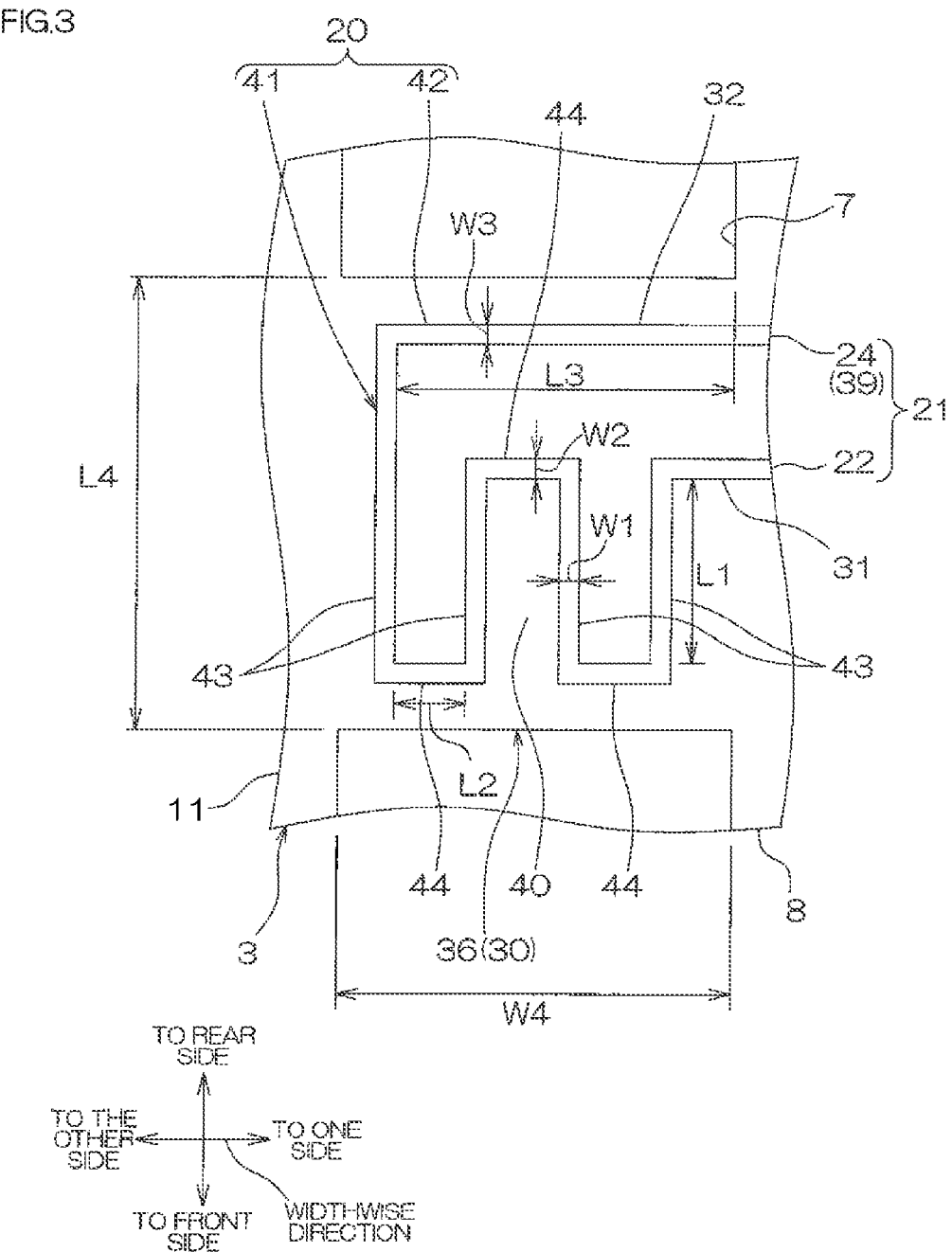
FIG. 3 shows an enlarged bottom view of a first driving portion in the gimbal portion shown in FIG. 2.
Figure 4:
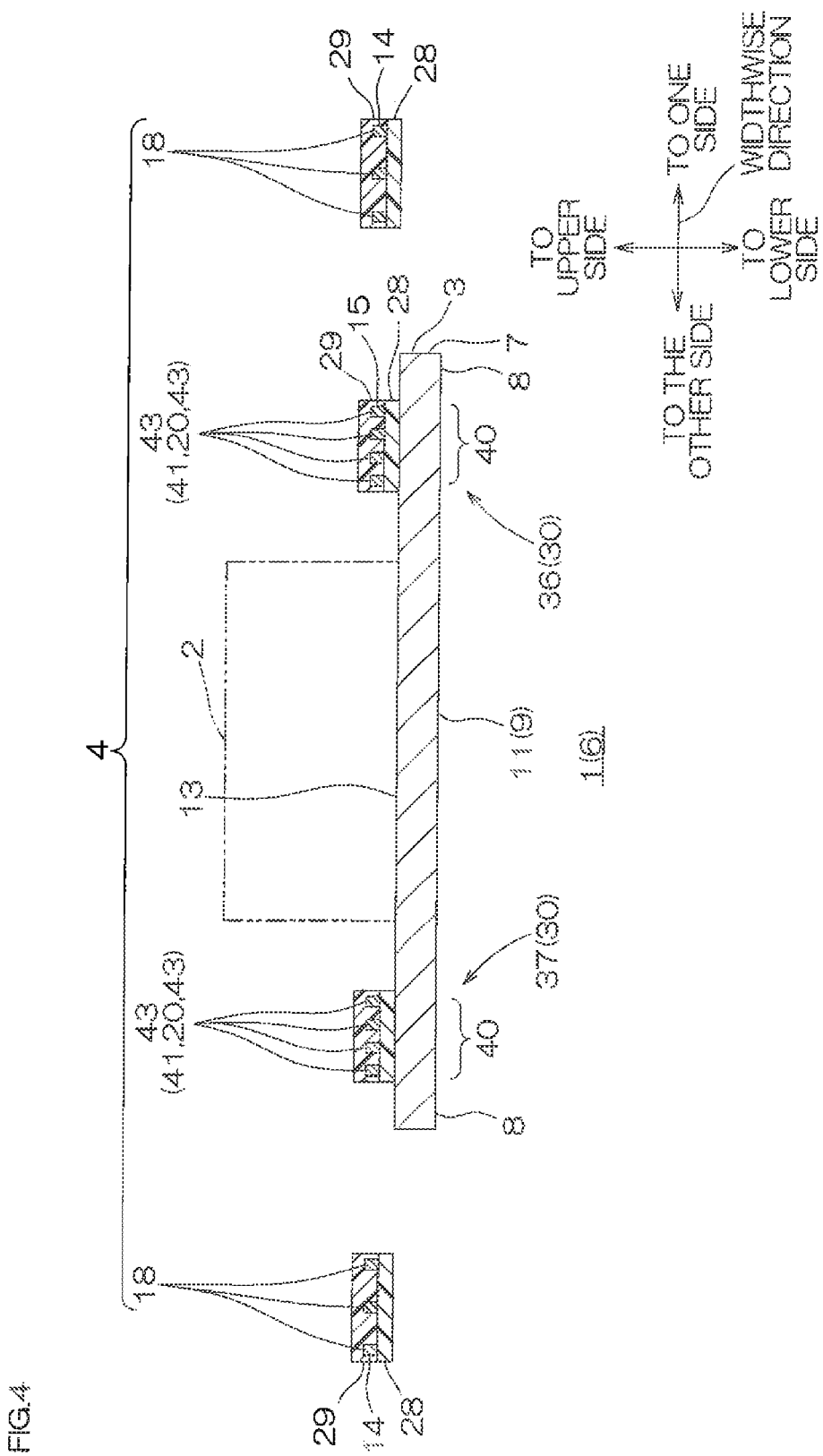
FIG. 4 shows a cross-sectional view of the gimbal portion shown in FIG. 2 along the line A-A.
Figure 5:
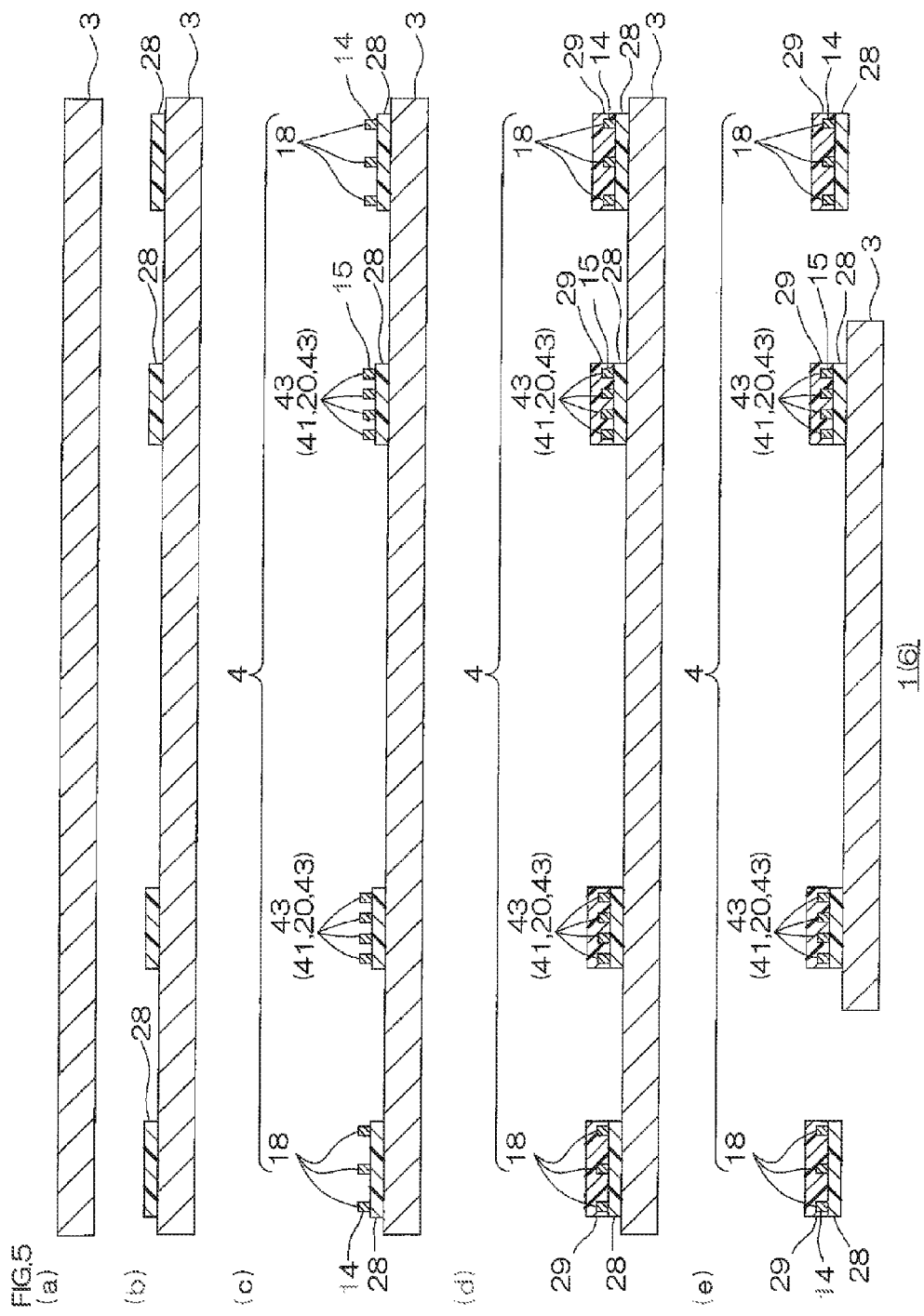
FIG. 5 is a process view illustrating a producing method of the suspension board with circuit shown in FIG. 4,
  (a) showing the step of preparing a metal supporting board,
  (b) showing the step of forming an insulating base layer,
  (c) showing the step of forming a conductive pattern,
  (d) showing the step of forming an insulating cover layer, and
  (e) showing the step of forming a slit.
Figure 6:
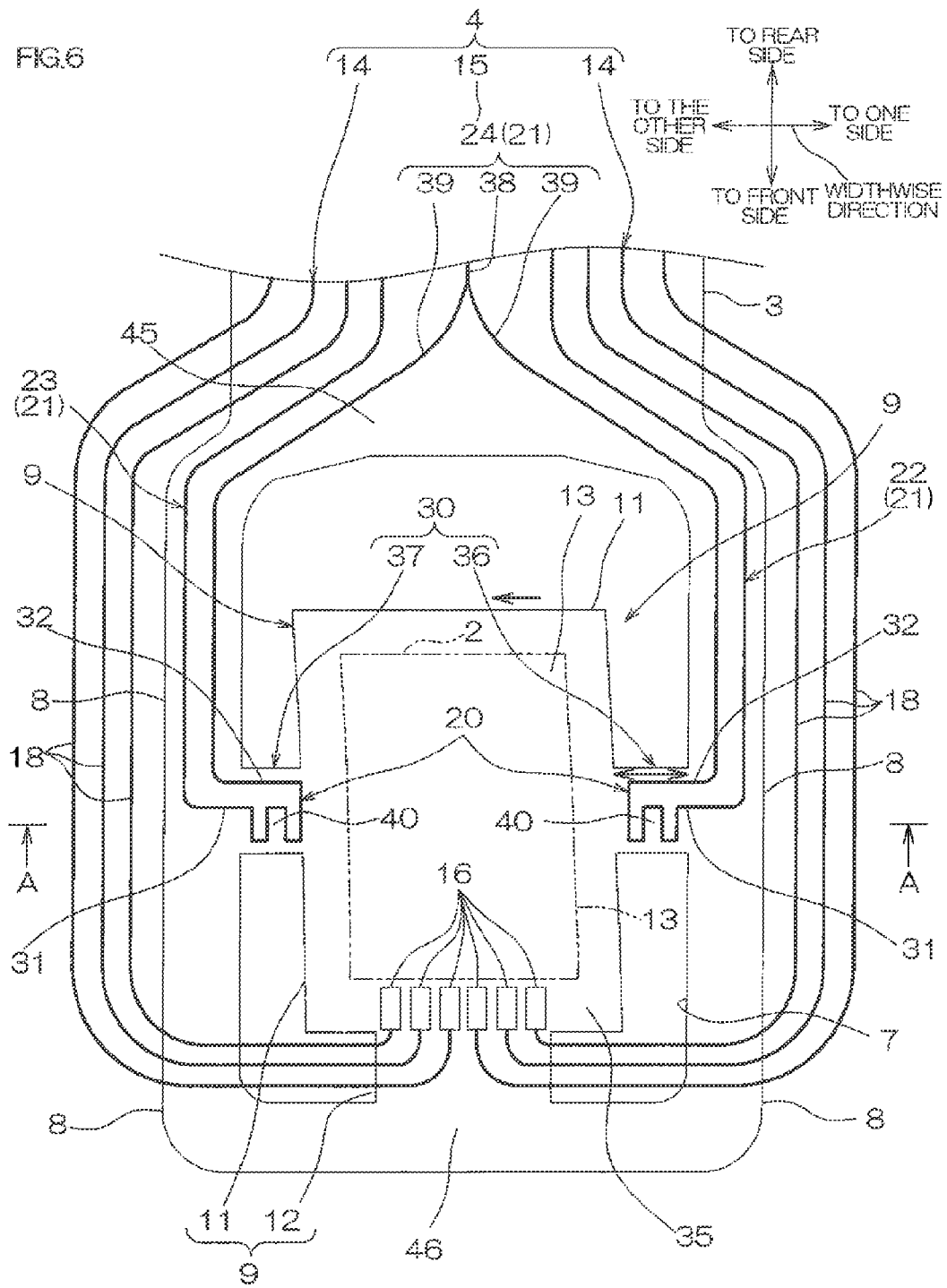
FIG. 6 shows a plan view when a stage is swung.

FIG. 1 shows a plan view of an embodiment of a suspension board with circuit of the present invention. FIG. 2 shows an enlarged plan view of a gimbal portion in the suspension board with circuit shown in FIG. 1. FIG. 3 shows an enlarged bottom view of a first driving portion in the gimbal portion shown in FIG. 2. FIG. 4 shows a cross-sectional view of the gimbal portion shown in FIG. 2 along the line A-A. FIG. 5 is a process view illustrating a producing method of the suspension board with circuit shown in FIG. 4. FIG. 6 shows a plan view when a stage is swung.

Note that, in FIGS. 1 to 3, an insulating base layer 28 and an insulating cover layer 29 each described later are omitted for clear illustration of relative positioning of a metal supporting board 3 and a conductive pattern 4 each described later.

In FIG. 1, a suspension board with circuit 1 on which a slider 2 (phantom line in FIG. 1) with a magnetic head (not shown) mounted thereon is mounted in a hard disk drive.

In the suspension board with circuit 1, the conductive pattern 4 is supported on the metal supporting board 3.

The metal supporting board 3 is formed in a shape corresponding to the outer shape of the suspension board with circuit 1, which is a generally rectangular flat belt shape extending in a longitudinal direction in plan view. The metal supporting board 3 integrally includes a main body portion 5, and a gimbal portion 6 (slider mounting portion) formed on the front side (on one longitudinal side, which applies to the following) of the main body portion 5.

The main body portion 5 is formed in a generally rectangular shape in plan view.

The gimbal portion 6 is formed so as to frontwardly extend from the front end of the main body portion 5. The gimbal portion 6 has a slit 7 formed in a frontwardly opened C-shape in plan view to extend therethrough in a thickness direction.

The gimbal portion 6 integrally includes a pair of outrigger portions (side facing portions) 8 each as a facing portion defined outside the slit 7 in a widthwise direction (direction perpendicular to the longitudinal direction), a rear facing portion 45 as a facing portion defined on the rear side of the slit 7, a front facing portion 46 as a facing portion defined on the front side of the slit 7, and a tongue portion 9 defined widthwise inwardly of the slit 7.

The pair of outrigger portions 8 are formed so as to protrude from the both widthwise end portions of the front end portion of the main body portion 5 to both widthwise outsides, and then linearly extend toward the front side.

The rear opposing portion 45 is formed as a region in a generally rectangular shape in plan view which widthwise extends continuously from the front end portion of the main body portion 5 on the rear side of the slit 7. The both widthwise end portions of the rear facing portion 45 are continued to the rear end portions of the pair of outrigger portions 8.

The front opposing portion 46 is formed as a region in a generally rectangular shape in plan view which widthwise extends on the front side of the slit 7. The widthwise both end portions of the front facing portion 46 are continued to the front end portions of the pair of outrigger portions 8.

The tongue portion 9 includes a stage 11 as a mounting portion in a generally rectangular shape in plan view which longitudinally extends, and a connecting portion 12 as a support portion formed on the front side of the stage 11.

The stage 11 is disposed widthwise inwardly of the pair of outrigger portions 8, on the front side of the rear facing portion 45, and on the rear side of the front facing portion 46 in spaced-apart and facing relation. The front end portion of the stage 11 is supported by the connecting portion 12.

At generally the center of the stage 11, a mounting region 13 where the slider 2 (phantom line) is mounted is defined and, in the front end portion of the stage 11, a terminal formation region 35 where head-side terminals 16 (described later) are formed is formed. The terminal formation region 35 is formed as a region widthwise extending on the front side of the mounting region 13.

The connecting portion 12 is formed on the front-side portion (front end portion) of the tongue portion 9, and formed in a generally rectangular shape in plan view which widthwise extends so as to be included in the stage 11 when projected in a front-rear direction. That is, the connecting portion 12 is formed smaller than the stage 11 in the widthwise direction. The connecting portion 12 is continued to the widthwise middle portion of the front end portion of the stage 11 and to the widthwise middle portion of the front facing portion 46 to provide connection therebetween.

Thus, the connecting portion 12 supports the front end portion of the stage 11, and is also connected to the facing portions (front facing portion 46, outrigger portions 8, and rear facing portion 45).

The conductive pattern 4 includes a first conductive pattern 14 and second conductive patterns 15.

The first conductive pattern 14 integrally includes the head-side terminals 16, external terminals 17, and signal wires 18 for connecting the head-side terminals 16 and the external terminals 17.

In the main body portion 5, the plurality of (six) signal wires 18 are provided along the front-rear direction, and arranged in parallel to be widthwise spaced apart from each other.

The individual signal wires 18 are disposed so as to protrude from the front end portion of the main body portion 5 to both outsides. Then, the signal wires 18 extend in the front-rear direction along the respective outrigger portions 8 on both widthwise outsides of the gimbal portion 6 to be subsequently bent widthwise inwardly. Thereafter, the signal wires 18 widthwise traverse the outrigger portions 8 and the front end portion of the slit 7, and then reach the connecting portion 12. After rearwardly bent in the connecting portion 12, the signal wires 18 reach the front end portions of the head-side terminals 16 in the terminal formation region 35.

The external terminals 17 are disposed in the rear end portion of the main body portion 5. The plurality of (six) external terminals 17 are provided such that the respective rear end portions of the signal wires 18 are connected thereto. The external terminals 17 are arranged to be aligned and spaced apart from each other in each of the widthwise direction and the front-rear direction.

In the terminal formation region 35, the plurality of (six) head-side terminals 16 are provided such that the respective front end portions of the signal wires 18 are connected thereto. More specifically, the head-side terminals 16 are disposed to be widthwise spaced apart from each other.

In the first conductive pattern 14, a write signal transmitted from an external circuit board (not shown) is inputted to the magnetic head (not shown) on the slider 2 via the external terminals 17, the signal wires 18, and the head-side terminals 16, while a read signal read using the magnetic head is inputted to the external circuit board (not shown) via the head-side terminals 16, the signal wires 18, and the external terminals 17.

The second conductive patterns 15 are formed as a first driving circuit including heater terminals 19, heaters 20, and heater wires 21 connecting the heater terminals 19 and the heaters 20.

In the main body portion 5, the plurality of heater terminals 19 are arranged to be widthwise aligned and spaced apart from each other on the front side of the external terminals 17. Specifically, the heater terminals 19 include a first heater terminal 25, a second heater terminal 26, and a third heater terminal 27.

The heater wires 21 are formed to be disposed in the main body portion 5 to be widthwise spaced apart from the signal wires 18 and extend in the front-rear direction. Specifically, the heater wires 21 are disposed between the widthwise inner two signal wires 18 to be spaced apart therefrom. The heater wires 21 include three wires arranged to be widthwise spaced apart from each other.

Specifically, the heater wires 21 include a first heater wire 22 disposed on one widthwise side to be electrically connected to the first heater terminal 25, a second heater wire 23 disposed on the other widthwise side to be electrically connected to the second heater terminal 26, and a third heater wire 24 disposed between the first heater wire 22 and the second heater wire 23, more specifically at the widthwise middle to be electrically connected to the third heater terminal 27.

In the gimbal portion 6, the heater wires 21 are disposed to obliquely frontwardly extend (while one of them is branched) from the front end portion of the main body portion 5 on both widthwise sides. After reaching the both widthwise end portions of the rear facing portion 45, the heater wires 21 then extend along the pair of outrigger portions 8 to be bent widthwise inwardly at the middle portions of the pair of outrigger portions 8 in the front-rear direction and reach the heaters 20 of driving portions 30 described later.

Specifically, as shown in FIG. 2, in the gimbal portion 6, the first heater wire 22 is disposed to obliquely frontwardly extend from the front end portion of the main body portion 5 on one widthwise side, and reach one widthwise end portion of the rear facing portion 45. Then, the first heater wire 22 extends along one of the outrigger portions 8 to be bent to the other widthwise side at the middle portion of the one outrigger portion 8 in the front-rear direction and reach one end portion 31 of the heater 20.

Also, in the gimbal portion 6, the second heater wire 23 is disposed to obliquely frontwardly extend from the front end portion of the main body portion 5 on the other widthwise side, and reach the other widthwise end portion of the rear facing portion 45. Then, the second heater wire 23 extends along the other outrigger portion 8 to be bent to one widthwise side at the middle portion of the other outrigger portion 8 in the front-rear direction and reach the one end portion 31 of the heater 20.

On the other hand, in the gimbal portion 6, the third heater wire 24 is disposed to be divided into two branches. The two branches of the third heater wire 24 extend widthwise outwardly and obliquely frontwardly, and reach the both widthwise end portions of the rear facing portion 45. In the outrigger portions 8, the two branches of the third heater wire 24 extend in the front-rear direction so as to be inwardly spaced apart from the first heater wire 22 and the second heater wire 23, be bent widthwise inwardly at the respective middle portions of the other outrigger portions 8 in the front-rear direction, and reach the respective other end portions 32 of the heaters 20.

Note that, of the third heater wire 24, the portion rearward of the branched portion is defined as a main wire 38, and the portion frontward of the branched portion is defined as two branch wires 39.

The heaters 20 are provided in the driving portions 30 described later, and electrically connected to the heater wires 21.

The suspension board with circuit 1 includes the driving portions 30.

The driving portions 30 are provided between the tongue portion 9 and the outrigger portions 8.

Specifically, the two driving portions 30 are provided so that the stage 11 is widthwise interposed therebetween, and includes a first driving portion 36 and a second driving portion 37.

The first driving portion 36 is provided between the middle portion of one widthwise end portion of the stage 11 in the front-rear direction and the middle portion of the other widthwise end portion of the outrigger portion 8 on one widthwise side in the front-rear direction.

The second driving portion 37 is provided between the middle portion of the other widthwise end portion of the stage 11 in the front-rear direction and the middle portion of one widthwise end portion of the outrigger portion 8 on the other widthwise side in the front-rear direction.

Next, the details of the first driving portion 36 are described with reference to FIGS. 3 and 4.

As shown in FIG. 3, the first driving portion 36 is in a generally rectangular shape in plan view, and includes the heater 20 and an expansive portion 40.

The heater 20 is made of a meander wire and integrally includes a meandering portion 41 and a connecting portion 42.

The meandering portion 41 is formed in a meandering shape in which linear portions 43 and turn-back portions 44 sequentially alternate.

The plurality of (four) linear portions 43 are arranged in parallel to be widthwise spaced apart from each other.

To the rear end portion of the widthwise outermost linear portion 43, the first heater wire 22 is electrically connected. To the rear end portion of the widthwise innermost linear portion 43, the connecting portion 42 described later is electrically connected.

The turn-back portions 44 connect the both end portions of the widthwise adjacent linear portions 43 in the front-rear direction such that connecting positions are alternately located on the front side and on the rear side.

The connecting portion 42 is formed in a linear shape continued to the rear end portion of the widthwise innermost linear portion 43 along the widthwise direction. To one widthwise end portion (the other end portion 32 of the heater 20) of the connecting portion 42, the branch wire 39 of the third heater wire 24 on one widthwise side is electrically connected.

The heater 20 is formed of a conductive material such as, e.g., copper, nickel, gold, a solder, or an alloy thereof. Preferably, the heater 20 is formed of copper.

The electric resistance of the heater 20 is higher than the electric resistance of the heater wire 21, and is in a range of, e.g., 0.01 to 200Ω, or preferably 1 to 100 Ω.

The dimensions of the heater 20 are set appropriately such that the electric resistance is in the foregoing ranges. Specifically, a width W1 of each of the linear portions 43, a width W2 of each of the turn-back portions 44, and a width W3 of the connecting portion 42 are in a range of, e.g., 5 to 30 μm, or preferably 10 to 20 μm.

A length L1 of each of the linear portions 43 is in a range of, e.g., 20 to 200 μm, or preferably 50 to 100 μm. A length L2 of each of the turn-back portions 44 is in a range of, e.g., 5 to 30 μm, or preferably 10 to 20 μm. A length L3 of the connecting portion 42 is in a range of, e.g., 30 to 400 μm, or preferably 70 to 200 μm.

The thickness of the heater 20 is in a range of, e.g., 0.03 to 50 μm, or preferably 5 to 20 nm.

The total length of the heater 20, i.e., the sum of the total of the lengths L1 of the linear portions 43, the total of the lengths L2 of the turn-back portions 44, and the total length L3 of the connecting portion 42 is in a range of, e.g., 100 to 1200 μm, or preferably 200 to 500 μm.

The expansive portion 40 is formed in the same shape as the outer shape of the first driving portion 36. Specifically, the expansive portion 40 is formed in a generally rectangular shape in plan view including the heater 20 when projected in the thickness direction.

The expansive portion 40 is provided so as to cover the heater 20. Specifically, as shown in FIG. 4, the expansive portion 40 includes the metal supporting board 3, the insulating base layer 28 (described later) which is formed on the metal supporting board 3 and on which the heater 20 is to be formed, and the insulating cover layer 29 (described later) formed on the insulating base layer 28 so as to cover the heater 20.

Materials for forming the metal supporting board 3, the insulating base layer 28, and the insulating cover layer 29 in the expansive portion 40 are selected such that the thermal expansion coefficients thereof described next are in a desired range.

The thermal expansion coefficients of the metal supporting board 3, the insulating base layer 28, and the insulating cover layer 29 are set such that the differences among the expansion coefficients of the metal supporting board 3, the insulating base layer 28, and the insulating cover layer 29 have absolute values in a range of, e.g., not more than $1\times10^{-6}$ ($°$ C.$^{-1}$), preferably not more than $0.5\times10^{-6}$ ($°$ C.$^{-1}$), which are specifically in a range of, e.g., $5\times10^{-6}$ to $30\times10^{-6}$ ($°$ C.$^{-1}$), or preferably $10\times10^{-6}$ to $20\times10^{-6}$ ($°$ C.$^{-1}$).

The dimensions of the expansive portion 40 are set appropriately depending on the application and purpose thereof. As shown in FIG. 3, a width (length in the widthwise direction) W4 is in a range of, e.g., 50 to 300 μm, or preferably 100 to 200 μm, and a length (length in the front-rear direction) L4 is in a range of, e.g., 50 to 400 μm, or preferably 60 to 200 μm.

The thickness of the metal supporting board 3 in the expansive portion 40 is in a range of, e.g., 10 to 30 μm, or preferably 15 to 25 μm.

The thickness of the insulating base layer 28 in the expansive portion 40 is in a range of, e.g., 1 to 50 μm, or preferably 1 to 10 μm.

The thickness of the insulating cover layer 29 in the expansive portion 40 is in a range of, e.g., 2 to 10 μm, or preferably 3 to 6 μm.

The second driving portion 37 has the same configuration as that of the first driving portion 36, and is disposed symmetrically to the first driving portion 36 with respect to a line passing through the widthwise center of the stage 11 in the front-rear direction.

As shown in FIG. 4, the suspension board with circuit 1 includes the metal supporting board 3, the insulating base layer 28 formed on the metal supporting board 3, the conductive pattern 4 formed on the insulating base layer 28, and the insulating cover layer 29 formed on the insulating base layer 28 so as to cover the conductive pattern 4.

The metal supporting board 3 is disposed to extend over the main body portion 5 (see FIG. 1), the gimbal portion 6, and the driving portions 30 and formed of a metal material (conductive material) such as, e.g., stainless steel, a 42-alloy, aluminum, a copper-beryllium alloy, or phosphor bronze. Preferably, the metal supporting board 3 is formed of stainless steel. The thickness of the metal supporting board 3 in each of the main body portion 5 and the gimbal portion 6 is the same as the thickness of the metal supporting board 3 in the expansive portion 40.

The insulating base layer 28 is disposed to extend over the main body portion (see FIG. 1), the gimbal portion 6, and the driving portions 30 and formed to correspond to the portion where the conductive pattern 4 is formed. As shown in FIG. 2, the insulating base layer 28 is formed such that the lower surface thereof is exposed from the metal supporting board 3 in the portions corresponding to the signal wires 18, i.e., in the protruding parts from the outrigger portions 8 of the gimbal portion 6 and in the portions traversing the slit 7.

Also, as shown in FIG. 4, the insulating base layer 28 in the expansive portion 40 is formed on the entire upper surface of the metal supporting board 3.

The insulating base layer 28 is formed of an insulating material such as a synthetic resin such as, e.g., a polyimide resin, a polyamide imide resin, an acrylic resin, a polyether nitrile resin, a polyether sulfone resin, a polyethylene terephthalate resin, a polyethylene naphthalate resin, or a polyvinyl chloride resin. Preferably, the insulating base layer 28 is formed of a polyimide resin.

The thickness of the insulating base layer 28 in each of the main body portion 5 and the gimbal portion 6 is the same as the thickness of the insulating base layer 28 in the expansive portion 40.

The conductive pattern 4 in each of the main body portion 5 and the gimbal portion 6 is formed of the same conductive material as the conductive material of the heaters 20.

The thickness of the conductive pattern 4 in each of the main body portion 5 and the gimbal portion 6 is the same as the thickness of each of the heaters 20.

As shown in FIG. 1, the width of each of the signal wires 18 and the heater wires 21 is in a range of, e.g., 100 to 2000%, or preferably 200 to 1000% of the width of each of the heaters 20, which is specifically in a range of, e.g., 10 to 200 μm, or preferably 20 to 100 μm. The spacing between the individual signal wires 18 and the spacing between the individual heater wires 21 are in a range of, e.g., 10 to 1000 μm, or preferably 20 to 100 μm. The distances between the widthwise inner signal wires 18 and the widthwise outer heater wires 21 (specifically the first heater wire 22 and the second heater wire 23) are in a range of, e.g., 50 to 10000 μm, or preferably 100 to 1000 μm.

The width of each of the head-side terminals 16, the external terminals 17, and the heater terminals 19 is in a range of, e.g., 20 to 1000 μm, or preferably 30 to 800 μm. The spacing between the individual head-side terminals 16, the spacing between the individual external terminals 17, the spacing between the individual heater terminals 19, and the distances between the external terminals 17 and the heater terminals 19 are in a range of, e.g., 20 to 1000 μm, or preferably 30 to 800 μm.

The insulating cover layer 29 is disposed to extend over the main body portion 5, the gimbal portion 6, and the driving portions 30. As shown in FIG. 4, the insulating cover layer 29 in each of the main body portion 5 (see FIG. 1) and the gimbal portion 6 is disposed on the insulating base layer 28 so as to correspond to the portion where the conductive pattern 4 is disposed. The insulating cover layer 29 in each of the driving portions 30 is formed in a shape corresponding to the outer shape of the driving portion 30.

More specifically, as shown in FIG. 1, the insulating cover layer 29 is formed in a pattern covering the signal wires 18, the heater wires 21, and the heaters 20 and exposing the head-side terminals 16, the external terminals 17, and the heater terminals 19.

The insulating cover layer 29 is formed of the same insulating material as the insulating material of the insulating base layer 28. The thickness of the insulating cover layer 29 in each of the main body portion 5 and the gimbal portion 6 is the same as the thickness of the insulating cover layer 29 in each of the driving portions 30.

Next, a producing method of the suspension board with circuit 1 is described with reference to FIG. 5.

First, in the method, as shown in FIG. 5(a), the metal supporting board 3 in the form of a flat plate is prepared.

Next, as shown in FIG. 5(b), the insulating base layer 28 is formed over the metal supporting board 3.

For example, a varnish of a photosensitive insulating material is applied onto the metal supporting board 3, dried, exposed to light, developed, and then cured by heating to form the insulating base layer 28 in the foregoing pattern.

Note that the insulating base layer 28 is formed also on the metal supporting board 3 in which the slit 7 (see FIG. 2) is formed in the step (see FIG. 5(e)) performed later.

Next, as shown in FIG. 5(c), the conductive pattern 4 is formed on the insulating base layer 28 by a pattern forming method such as an additive method or a subtractive method.

Next, as shown in FIG. 5(d), the insulating cover layer 29 is formed on the insulating base layer 28 into a pattern covering the signal wires 18, the heater wires 21, and the heaters 20.

Specifically, onto the insulating base layer 28 including the conductive pattern 4, a varnish of a photosensitive insulating material is applied, dried, exposed to light, developed, and cured by heating to form the insulating cover layer 29 in the foregoing pattern.

Next, as shown in FIG. 5(e), the metal supporting board 3 is trimmed by, e.g., etching, while the slit 7 (see FIG. 2) is formed in the metal supporting board 3.

In this manner, the suspension board with circuit 1 is produced.

Then, the suspension board with circuit 1 is mounted in a hard disk drive. In the mounting of the suspension board with circuit 1 in the hard disk drive, as shown by the phantom lines of FIGS. 2 and 4, the slider 2 mounting thereon a magnetic head (not shown) is mounted on the mounting region 13 of the stage 11 of the tongue portion 9 of the suspension board with circuit, while the magnetic head is electrically connected to the head-side terminals 16.

On the other hand, to the external terminals 17, an external circuit board (not shown) such as the read/write board not shown is electrically connected.

To the heater terminals 18, the power source (not shown) is connected. The power source has one end thereof connected to the third heater terminals 27 and the other end thereof connected to a switch (not shown) selectively connected to the first heater terminal 25 or the second heater terminal 26.

Next, the swing of the slider 2 resulting from driving by the first driving portion 36 is described with reference to FIGS. 1 and 6.

First, when the switch is connected to the first heater terminal 25, a first circuit is formed in which the first heater terminal 25, the first heater wire 22, the heater 20, one branch line 39, the main line 38, and the third heater terminal 27 are conducting electrically to allow a current to flow from the power source to the first heater terminal 25.

Then, the heater 20 of the first driving portion 36 generates heat to expand the expansive portion 40 of the first driving portion 36. As shown in FIG. 6, specifically, the expansive portion 40 expands in all directions including the widthwise direction (shown by the arrow), the front-rear direction, and the thickness direction (see FIG. 4).

Particularly by the widthwise expansion of the expansive portion 40, the stage 11 is relatively moved away from the outrigger portion 8 on one widthwise side.

Consequently, as shown by the arrow in FIG. 6, the stage 11 swings toward the other widthwise side around the widthwise middle portion of the rear end portion of the connecting portion 12. At the same time, the slider 2 swings toward the other widthwise side.

On the other hand, if the second driving portion 37 is driven to expand the expansive portion 40 thereof, the slider 2 swings in the direction opposite to the foregoing direction.

Note that, to drive the second driving portion 37, as shown in FIG. 1, the switch is connected to the second heater terminal 26. Consequently, a second circuit is formed in which the second heater terminal 26, the second heater wire 23, the heater 20, the other branch line 39, the main line 38, and the third heater terminal 27 are conducting electrically to allow a current to flow from the power source to the second heater terminal 26.

Therefore, in the second conductive patterns 15 forming the first driving circuit, the first circuit or the second circuit is selectively formed based on the operation of the switch of the power source to allow either one of the first driving portion 36 and the second driving portion 37 to be selectively driven.

Accordingly, the direction in which the slider 2 swings is appropriately selected by selectively forming the first circuit or the second circuit based on the operation of the switch of the power source.

As described above, in each of the driving portions 30 of the suspension board with circuit 1, when a current is allowed to flow in the heater 20, the heater 20 generates heat. Consequently, the expansive portion 40 thermally expands due to the heat generated from the heater 20.

As a result, the stage 11 swings around the widthwise middle portion of the rear end portion of the connecting portion 12 so as to move away from the outrigger portion 8 on one widthwise side or the other widthwise side.

That is, in the suspension board with circuit 1, the driving portions 30 are provided in advance in the suspension board with circuit 1. Therefore, it is possible to avoid the trouble of separately producing the piezoelectric elements and disposing the piezoelectric elements, while allowing accurate and fine adjustment of the position and angle of the magnetic head mounted on the slider 2.

In particular, in this embodiment, the metal supporting board 3, the insulating base layer 28, and the insulating cover layer 29 each forming the expansive portion 40 of each of the driving portions 30 and the metal supporting board 3, the insulating base layer 28, and the insulating cover layer 29 each forming the suspension board with circuit 1 are the same and formed in the same process steps during the production thereof. In addition, the second conductive patterns 15 including the heaters 20 and the first conductive pattern 14 of the suspension board with circuit are included in the same conductive pattern 4 and formed in the same process steps during the production thereof.

As a result, the driving portions 30 can be easily provided, and the suspension board with circuit 1 obtainable at a low production cost allows accurate and fine adjustment of the position and angle of the magnetic head.

Figure 7:
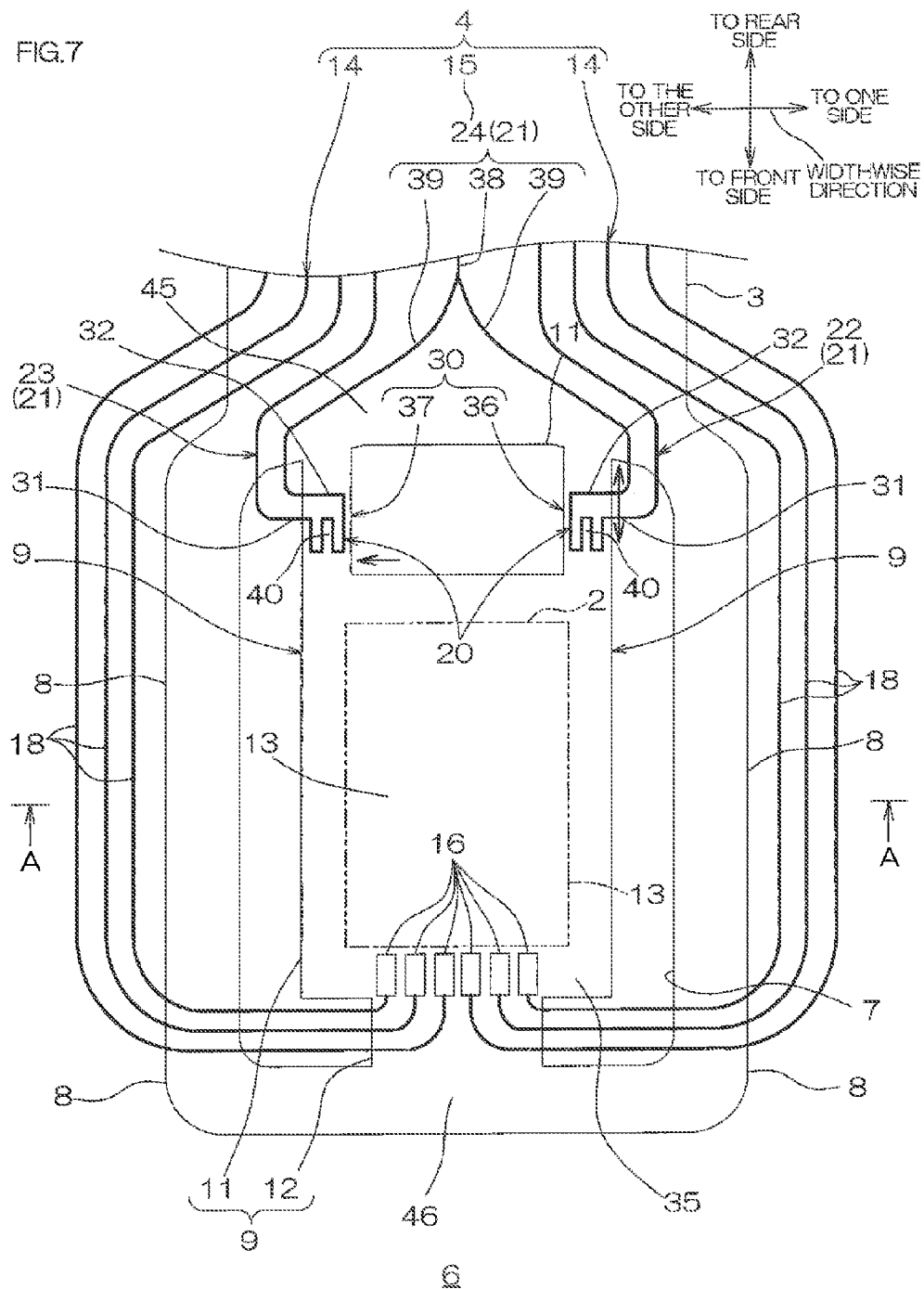
FIG. 7 shows a plan view of a gimbal portion in another embodiment (a form in which a driving portion is provided in the rear end portion of a stage) of the suspension board with circuit of the present invention.
Figure 8:
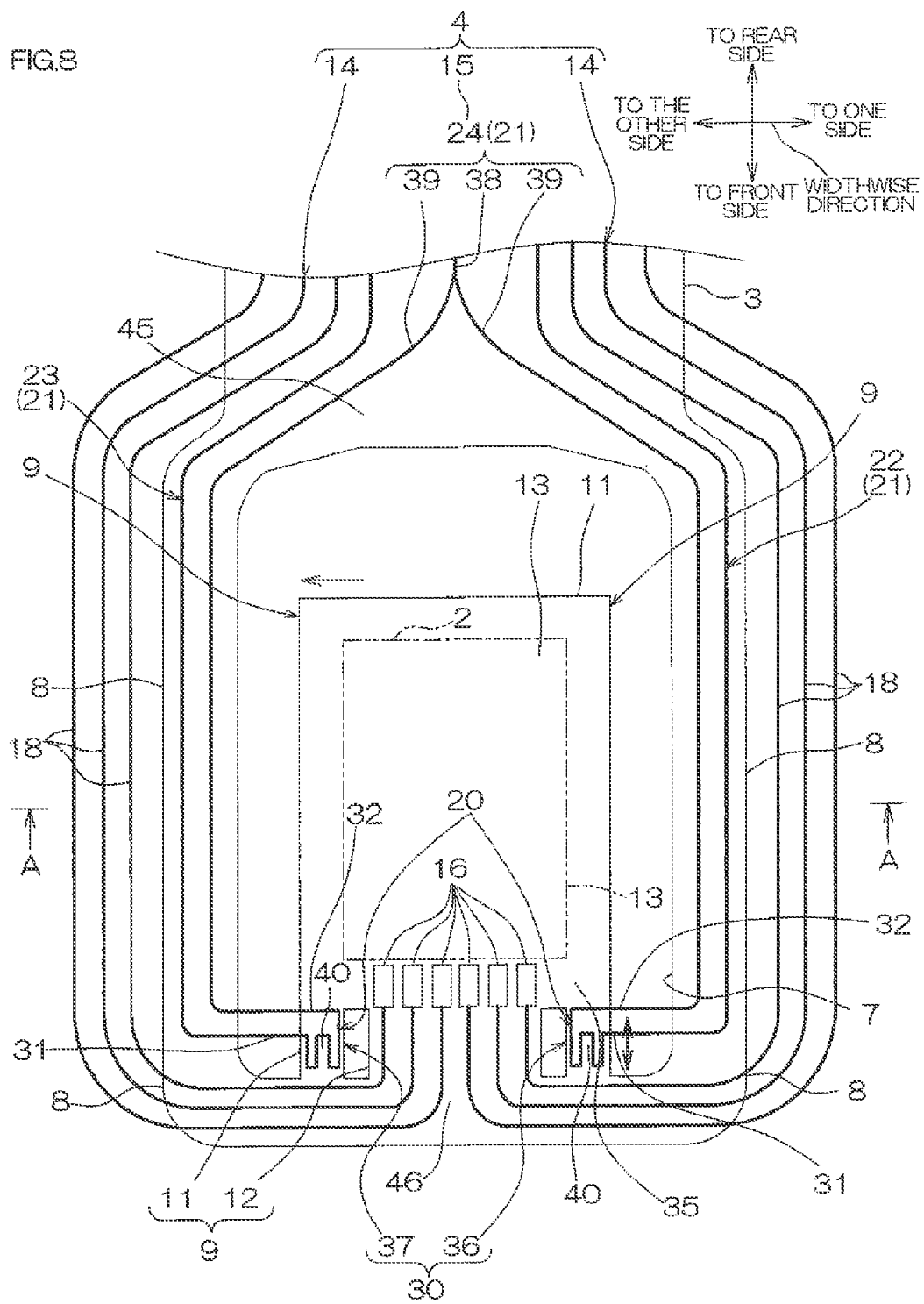
FIG. 8 shows a plan view of a gimbal portion in still another embodiment (a form in which a driving portion is provided in the front end portion of a stage) of the suspension board with circuit of the present invention.
Figure 9:
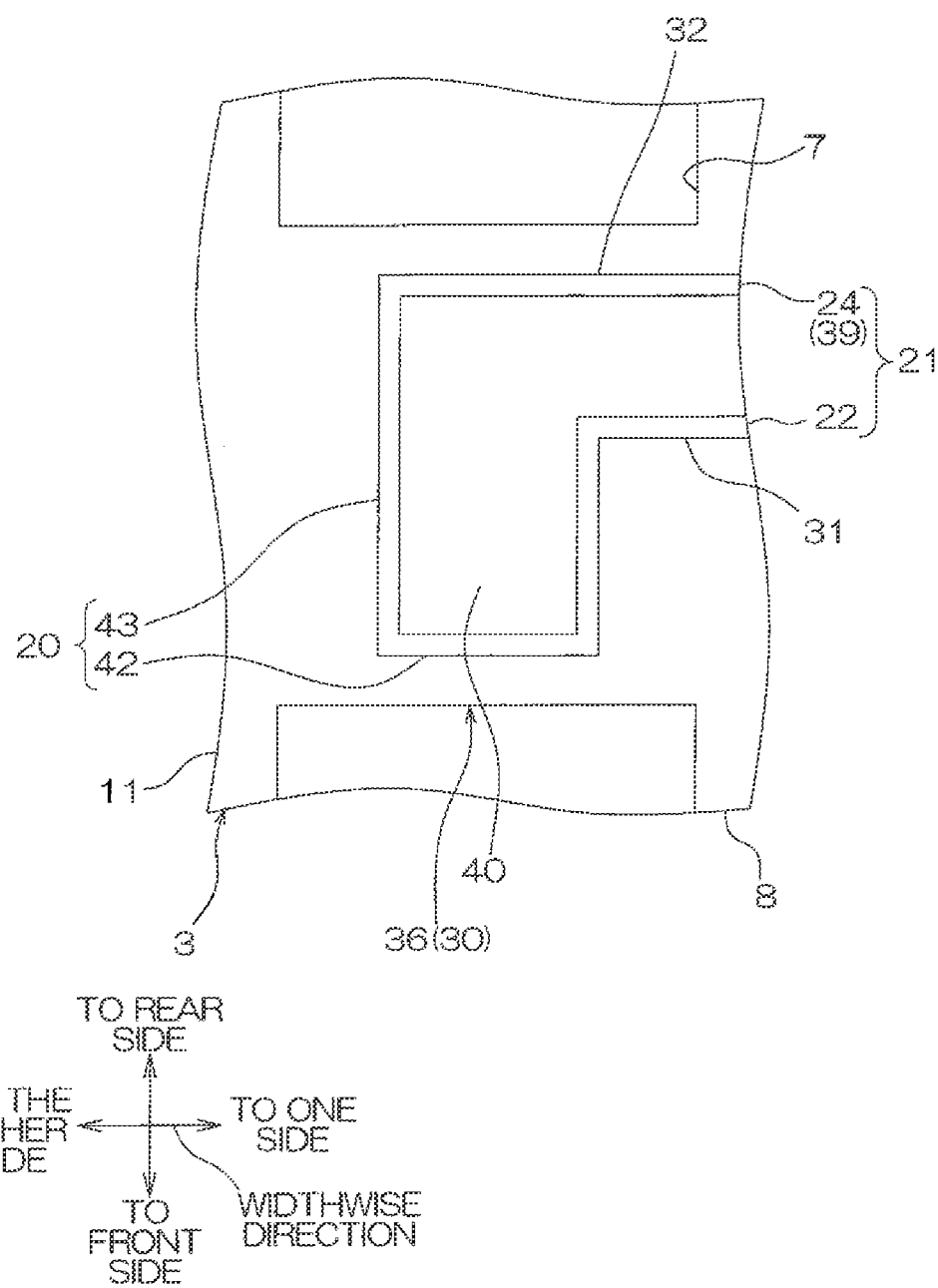
FIG. 9 shows an enlarged plan view of a driving portion in yet another embodiment (a form in which a heater has a generally U-shape in plan view) of the suspension board with circuit of the present invention.
Figure 10:
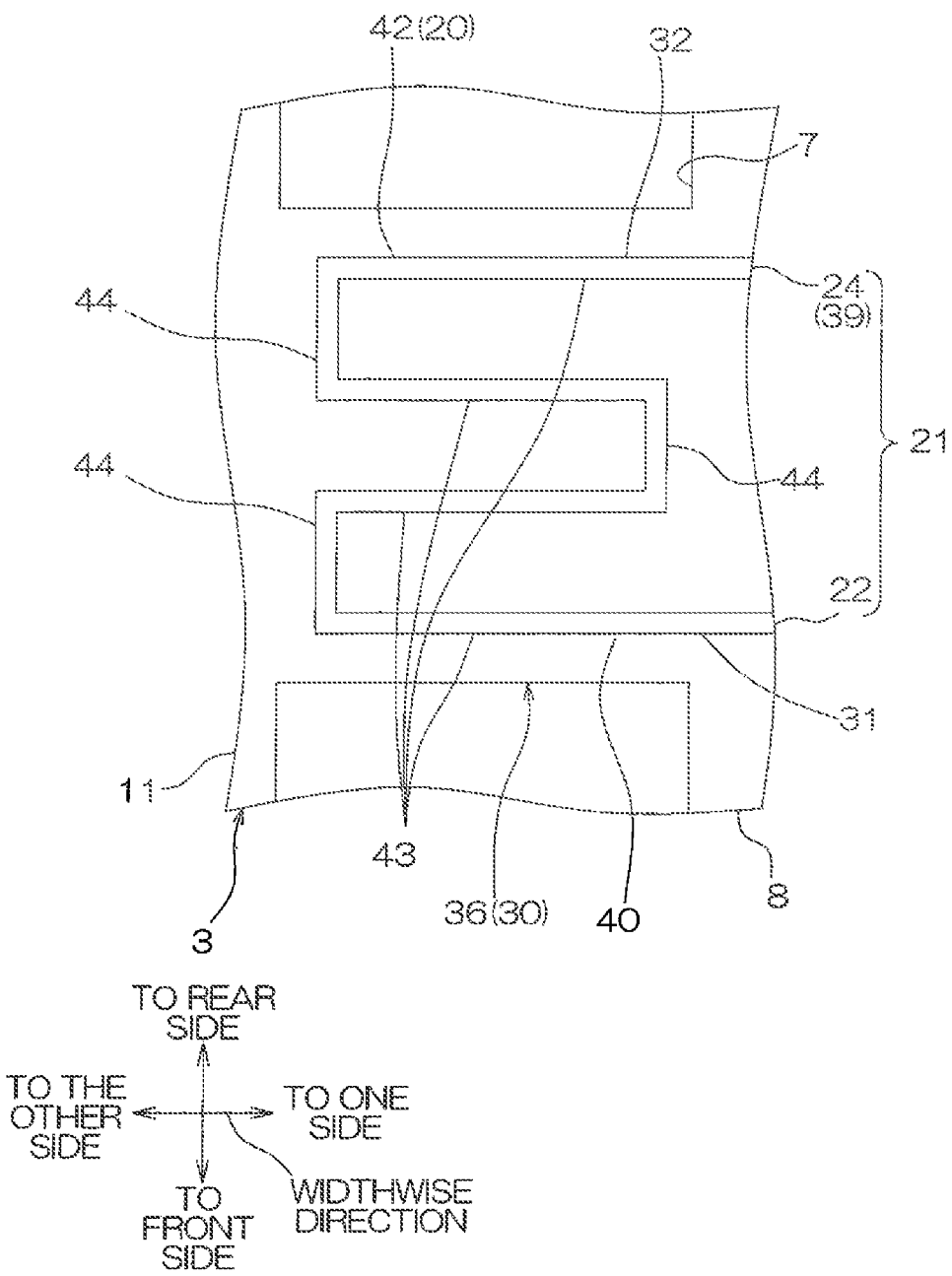
FIG. 10 shows an enlarged plan view of a driving portion in still another embodiment (a form in which linear portions are arranged in parallel in a front-rear direction) of the suspension board with circuit of the present invention.
Figure 11:
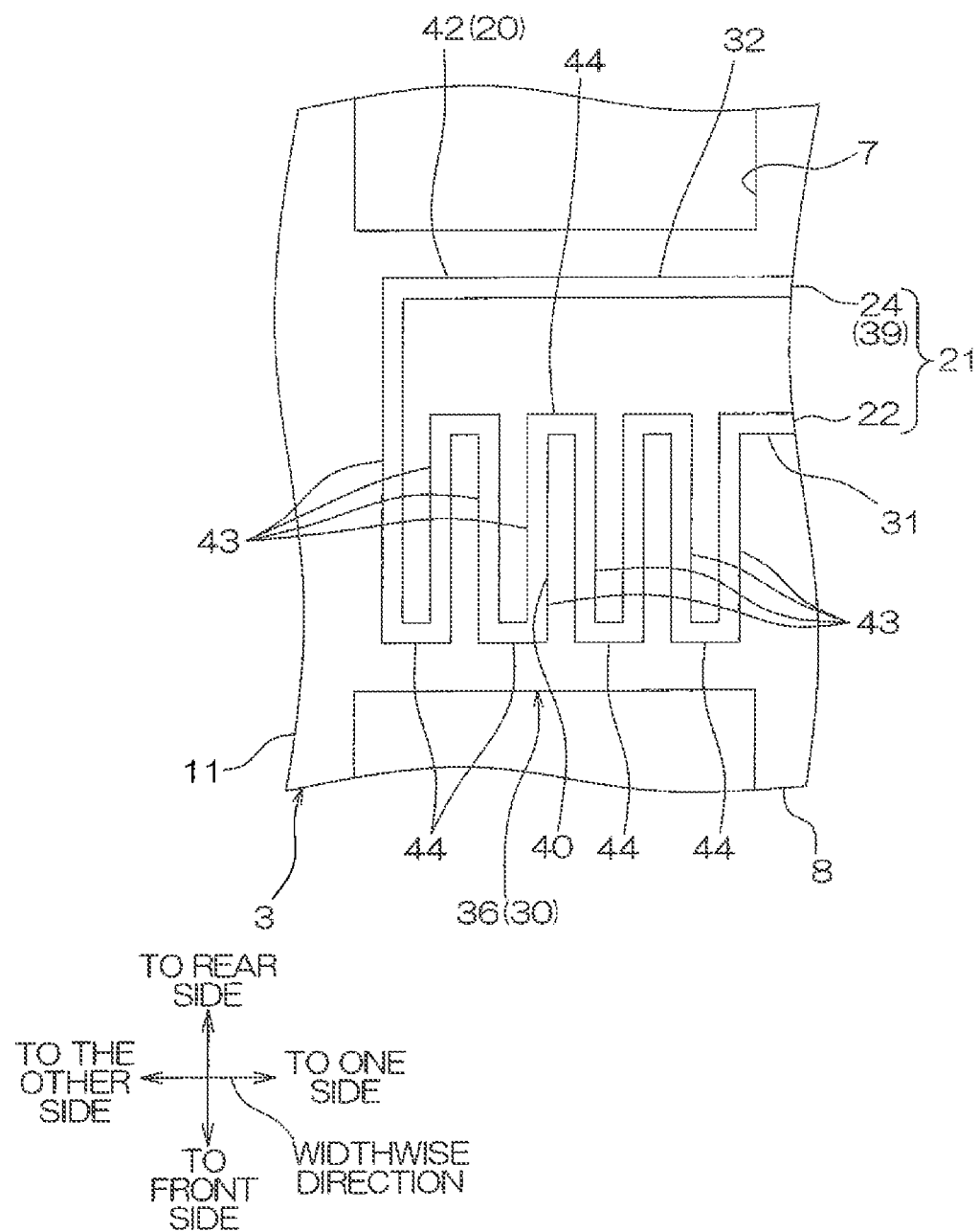
FIG. 11 shows an enlarged plan view of a driving portion in yet another embodiment (a form in which eight linear portions are provided) of the suspension board with circuit of the present invention.
Figure 12:
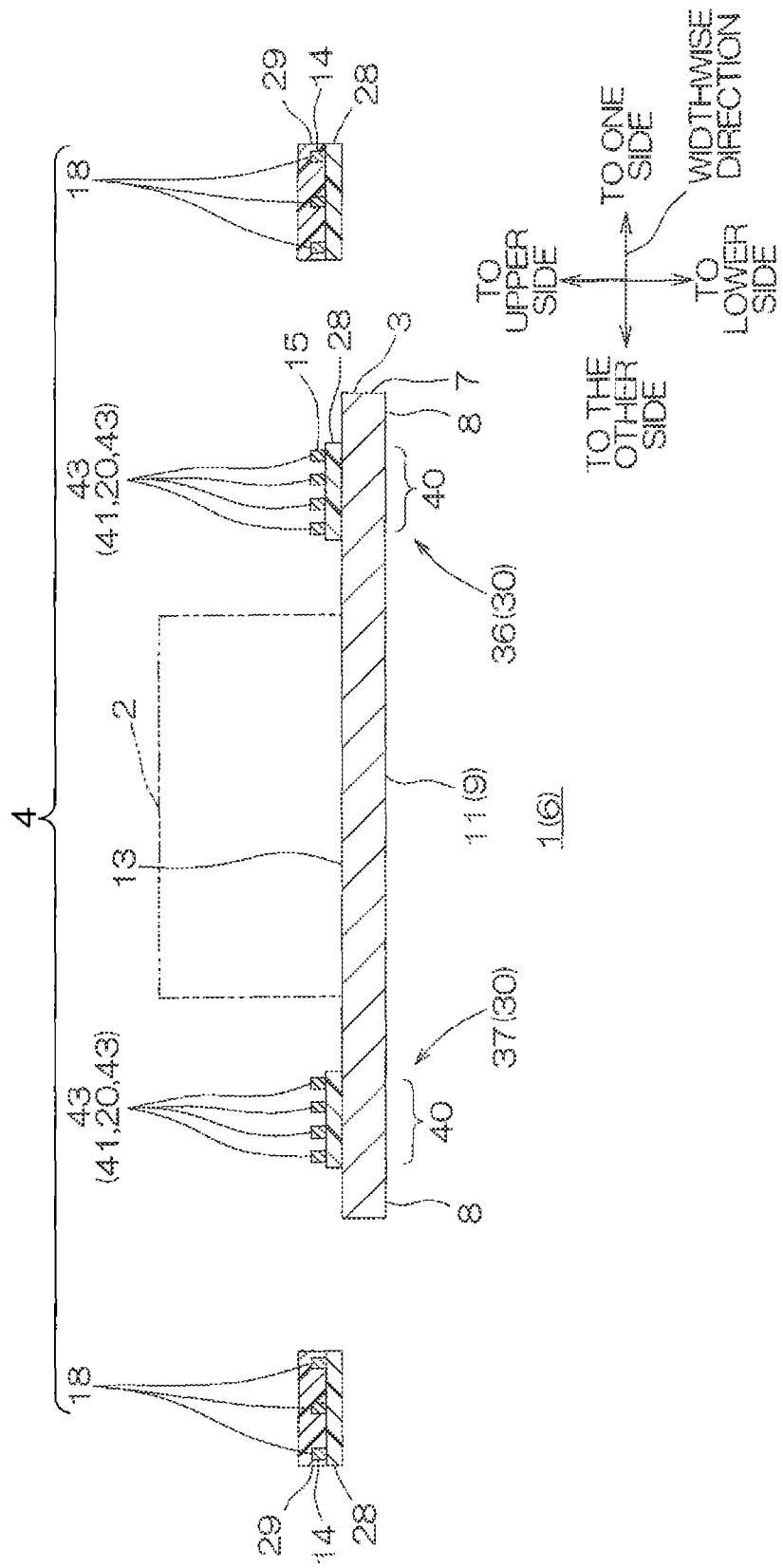
FIG. 12 shows a cross-sectional view of still another embodiment (a form in which an expansive portion is formed of a metal supporting board and an insulating base layer) of the suspension board with circuit of the present invention.
Figure 13:
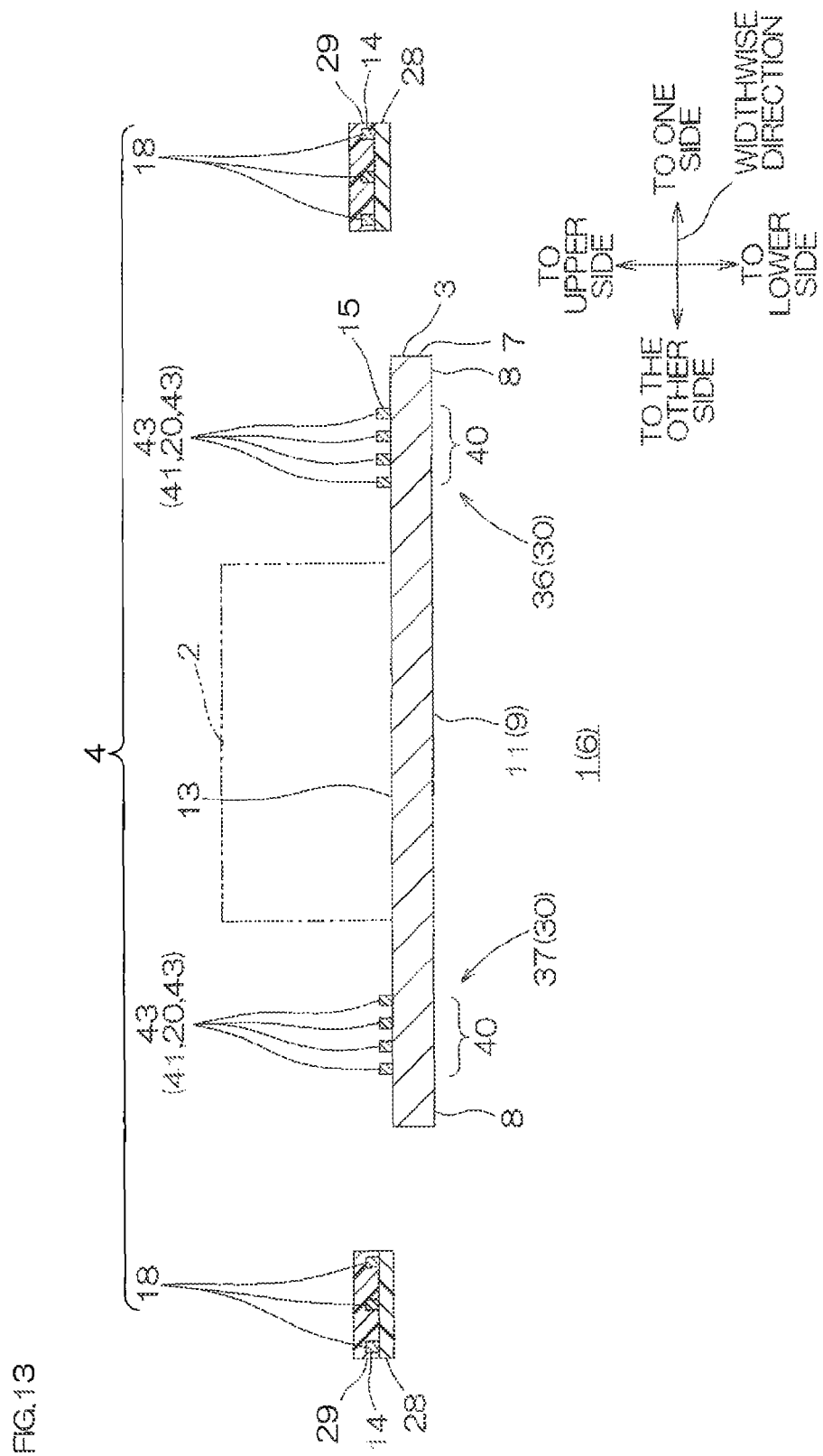
FIG. 13 shows a cross-sectional view of yet another embodiment (a form in which an expansive portion is formed of a metal supporting board) of the suspension board with circuit of the present invention.
Figure 14:
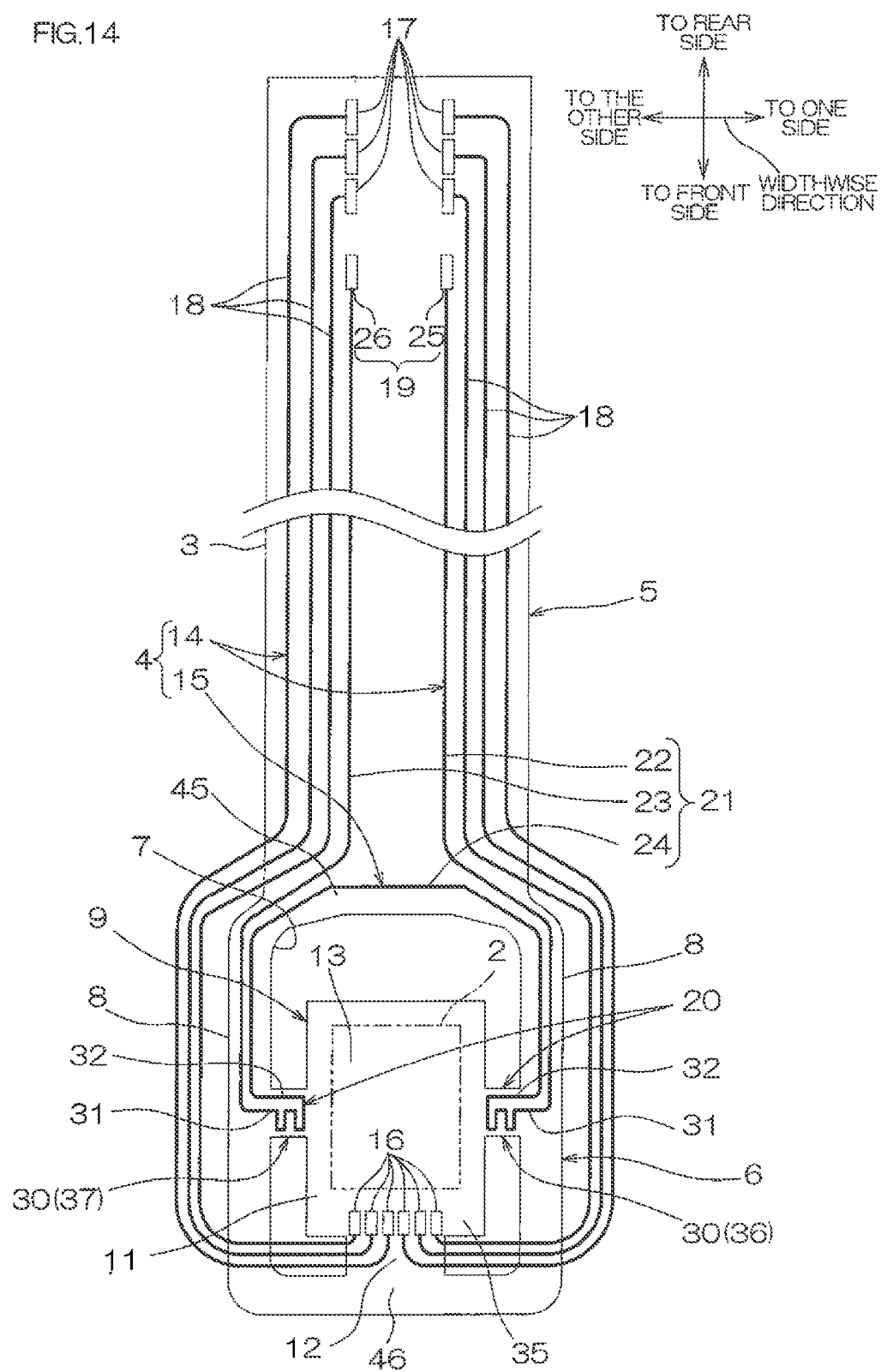
FIG. 14 shows a plan view of still another embodiment (a form in which a heater terminal includes a first heater terminal and a second heater terminal) of the suspension board with circuit of the present invention.
Figure 15:
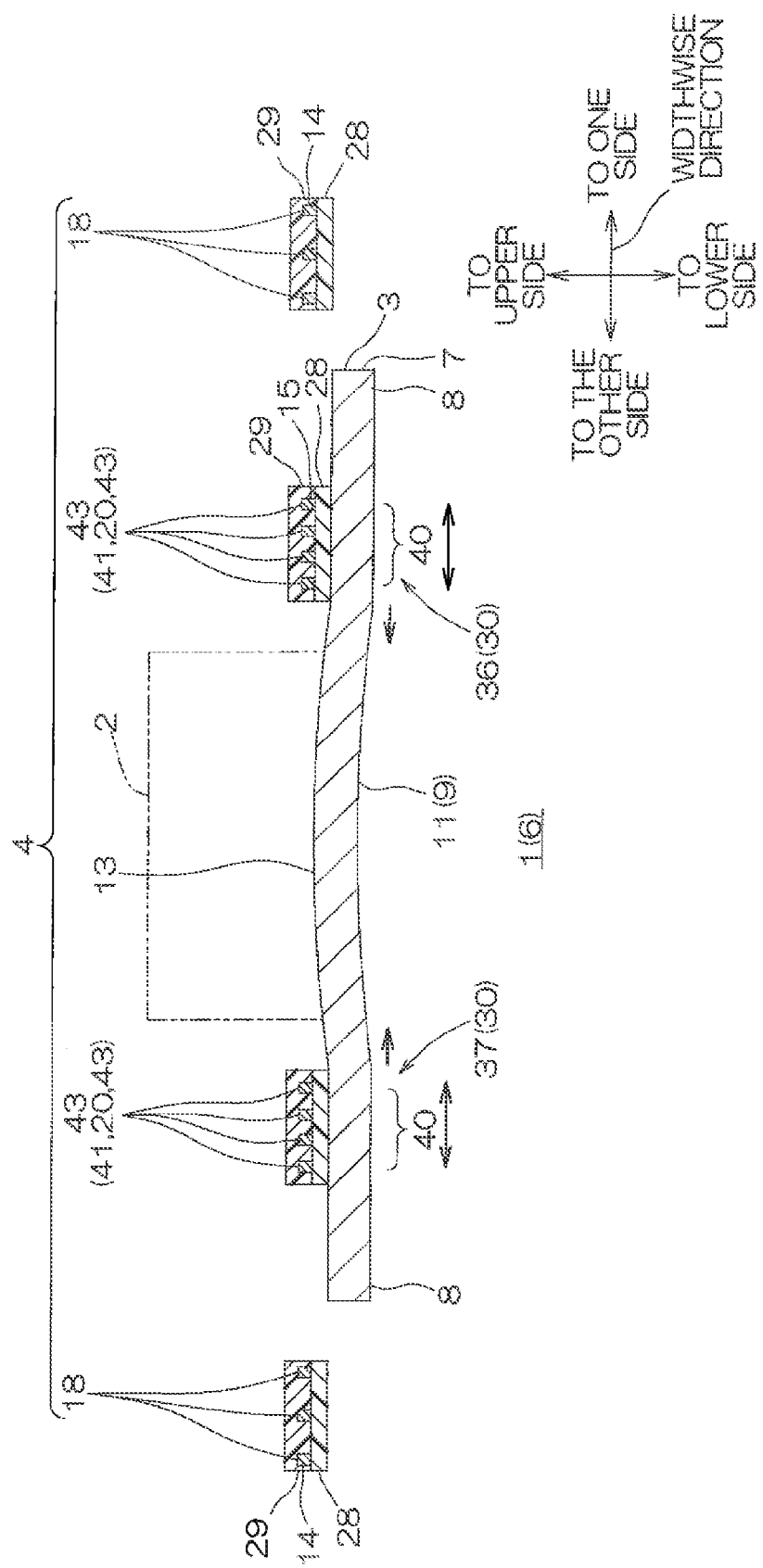
FIG. 15 shows a cross-sectional view when the stage of the gimbal portion shown in FIG. 14 is swung.
Figure 16:
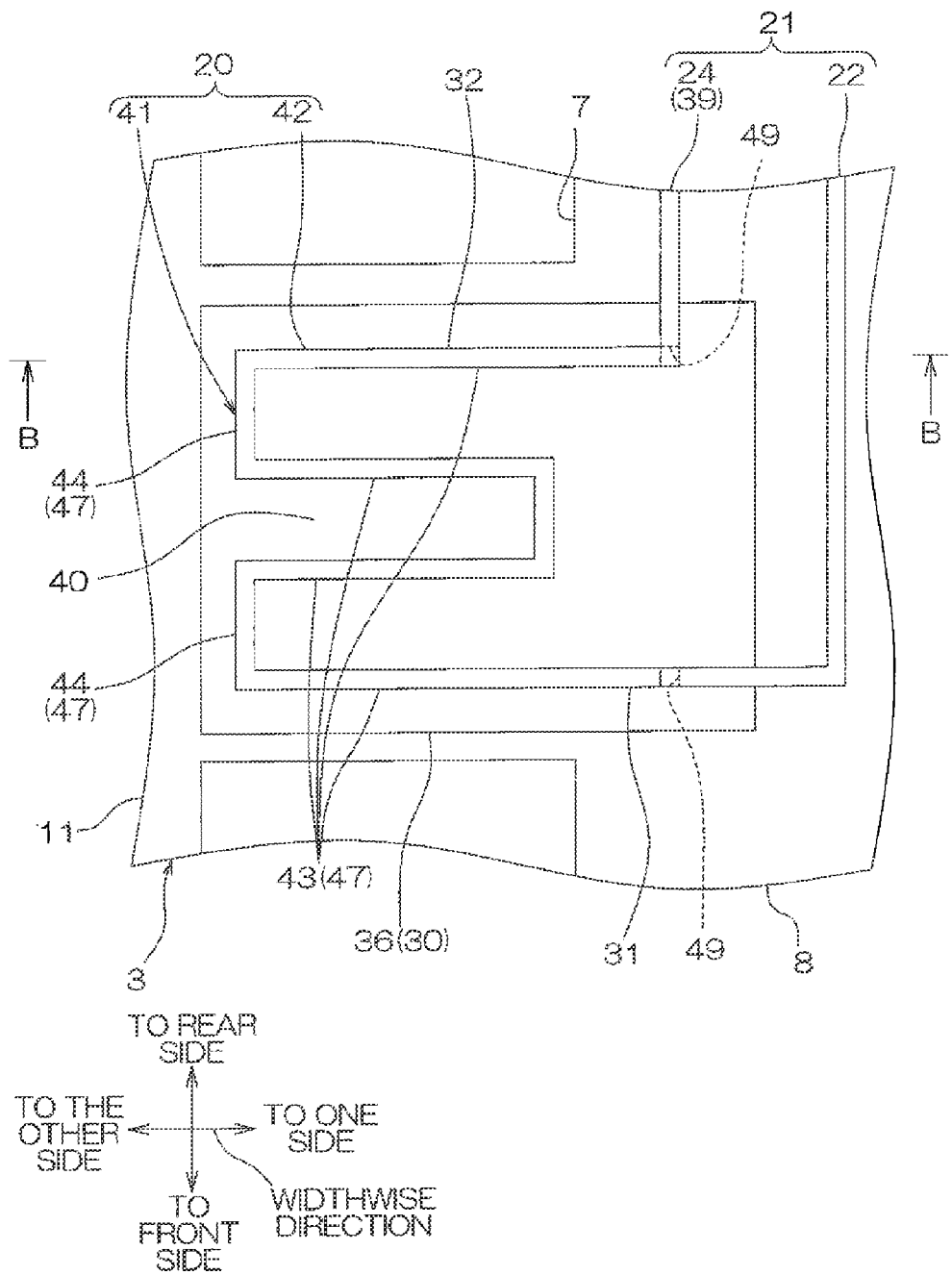
FIG. 16 shows an enlarged plan view of a first driving portion in yet another embodiment (a form in which a heater is formed of a metal supporting pattern) of the suspension board with circuit of the present invention.
Figure 17:
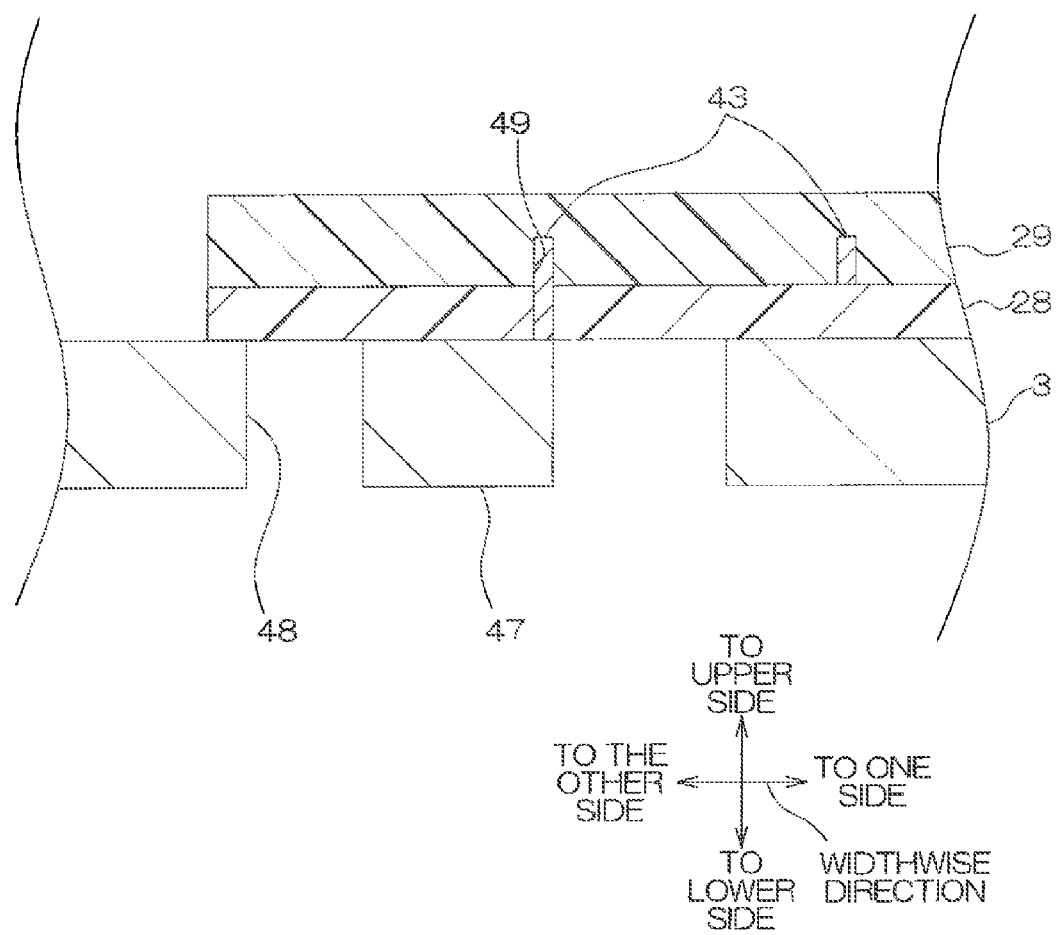
FIG. 17 shows a cross-sectional view of the suspension board with circuit shown in FIG. 16.
Figure 18:
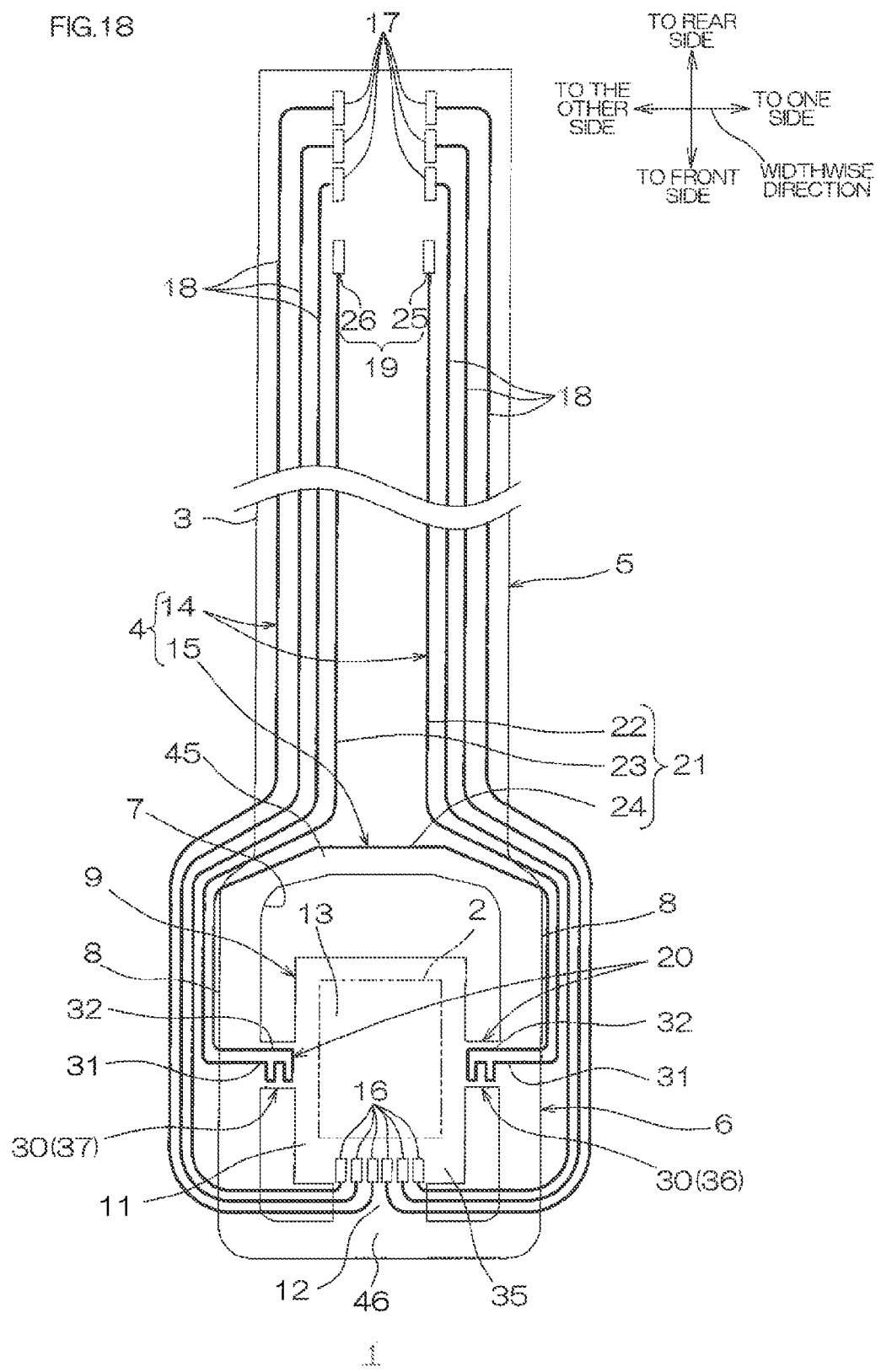
FIG. 18 shows a plan view of still another embodiment (a form in which heater wires are formed together with signal wires into bundles) of the suspension board with circuit of the present invention.
Figure 19:
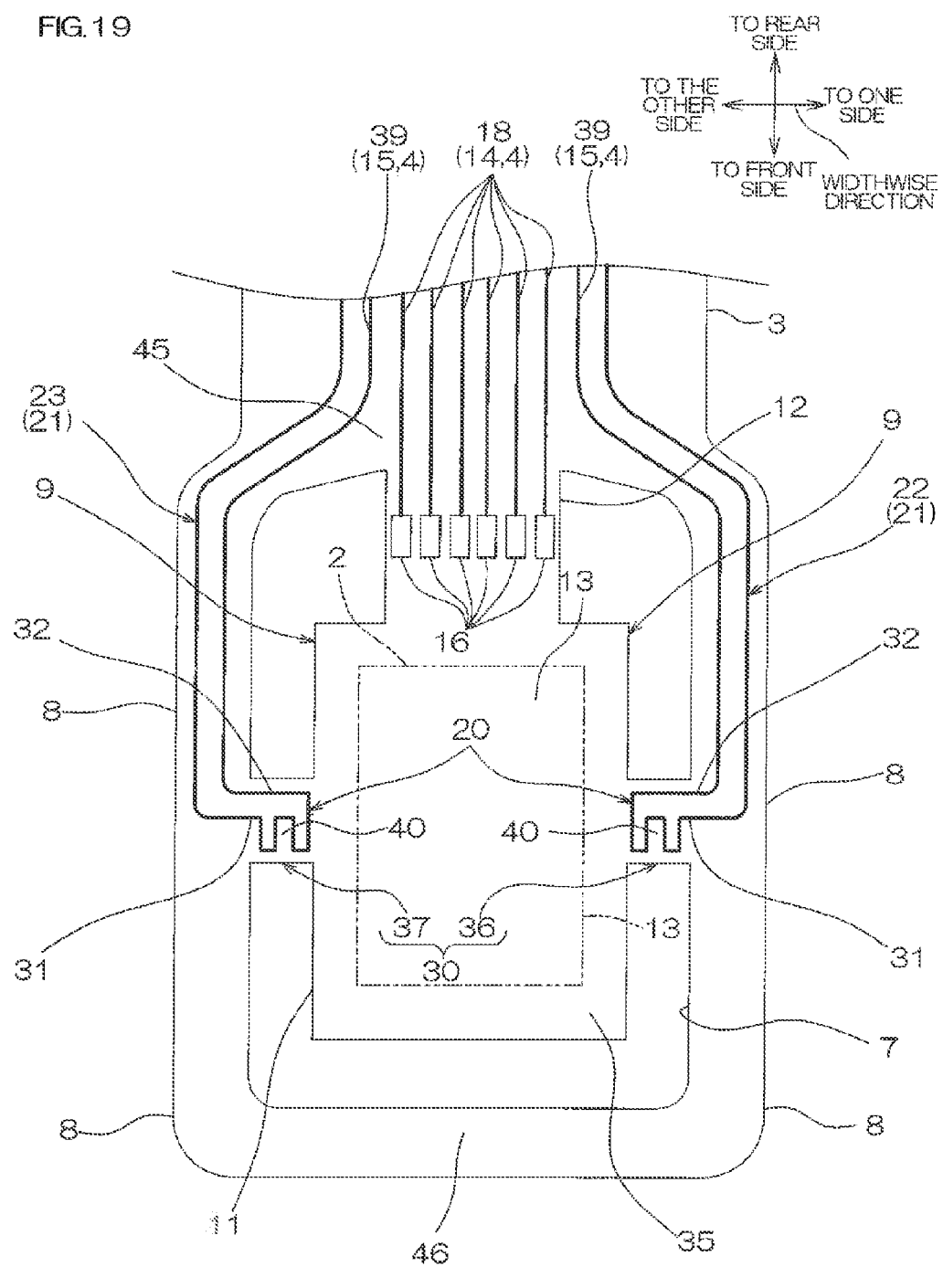
FIG. 19 shows a plan view of a gimbal portion in yet another embodiment (a form in which a connecting portion is connected to a rear facing portion) of the suspension board with circuit of the present invention.
Figure 20:
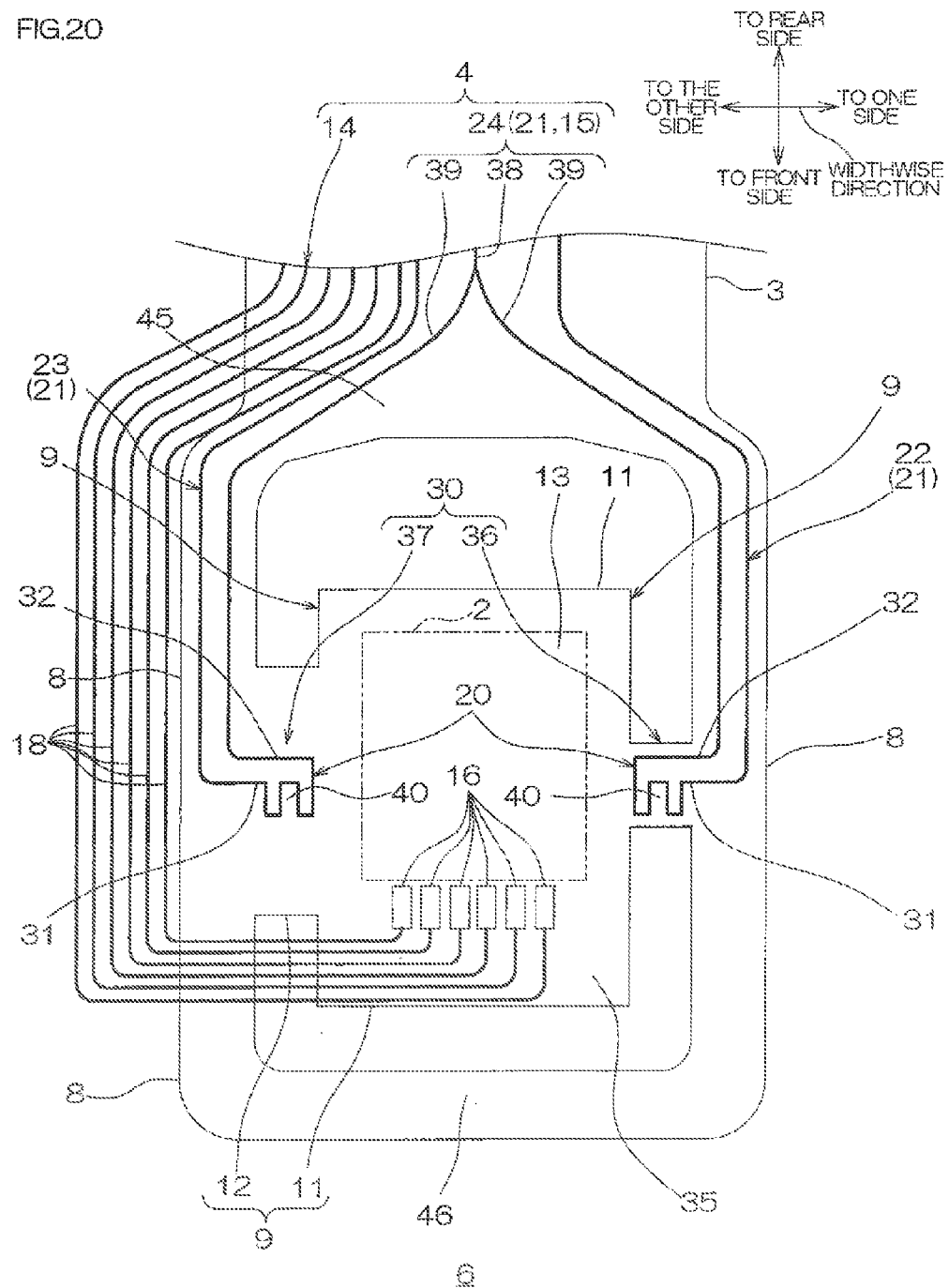
FIG. 20 shows a plan view of a gimbal portion in still another embodiment (a form in which a connecting portion is connected to outrigger portions) of the suspension board with circuit of the present invention.
Figure 21:
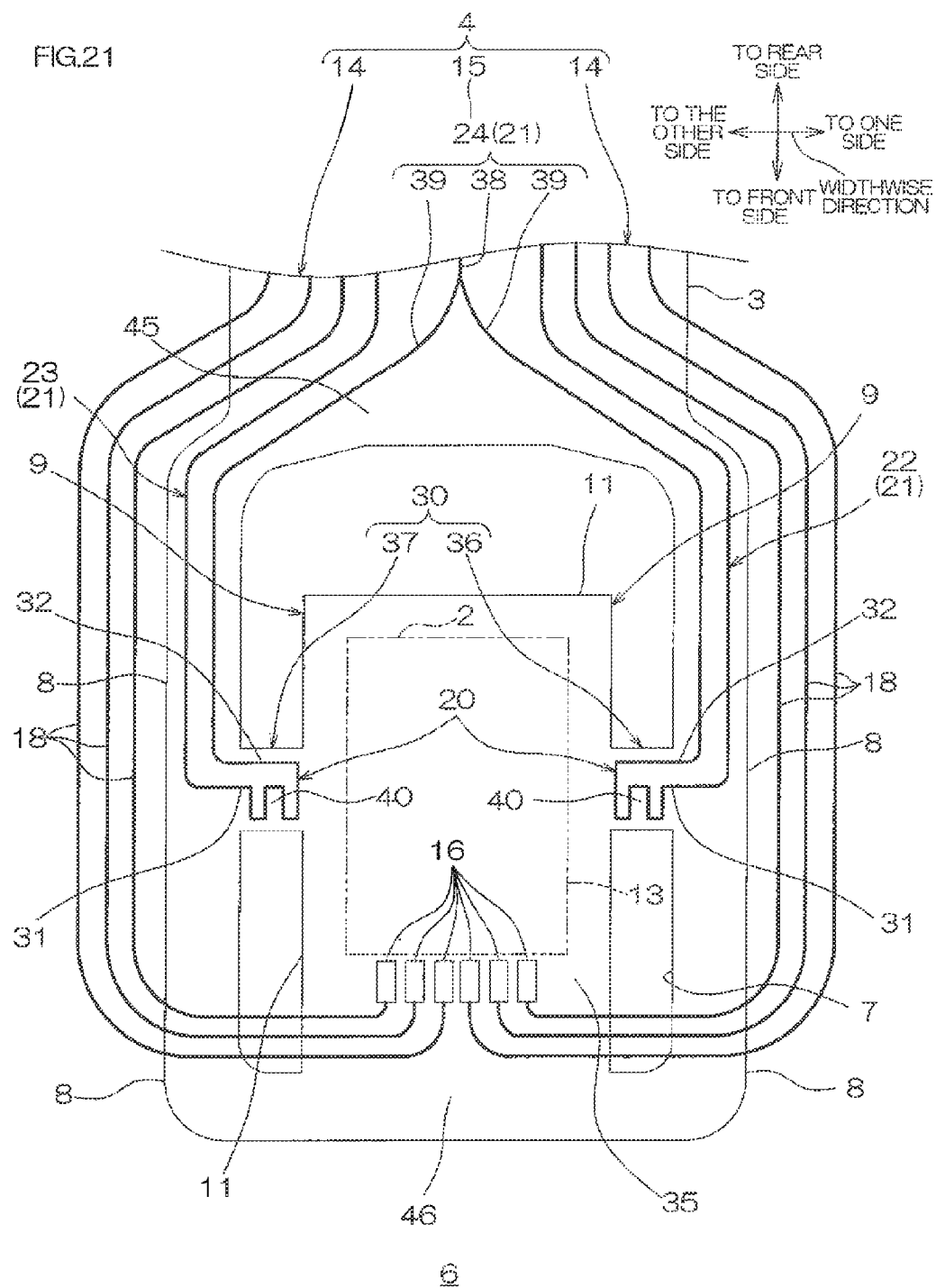
FIG. 21 shows a plan view of a gimbal portion in yet another embodiment (a form in which a stage is directly supported on a front facing portion) of the suspension board with circuit of the present invention.
Figure 22:
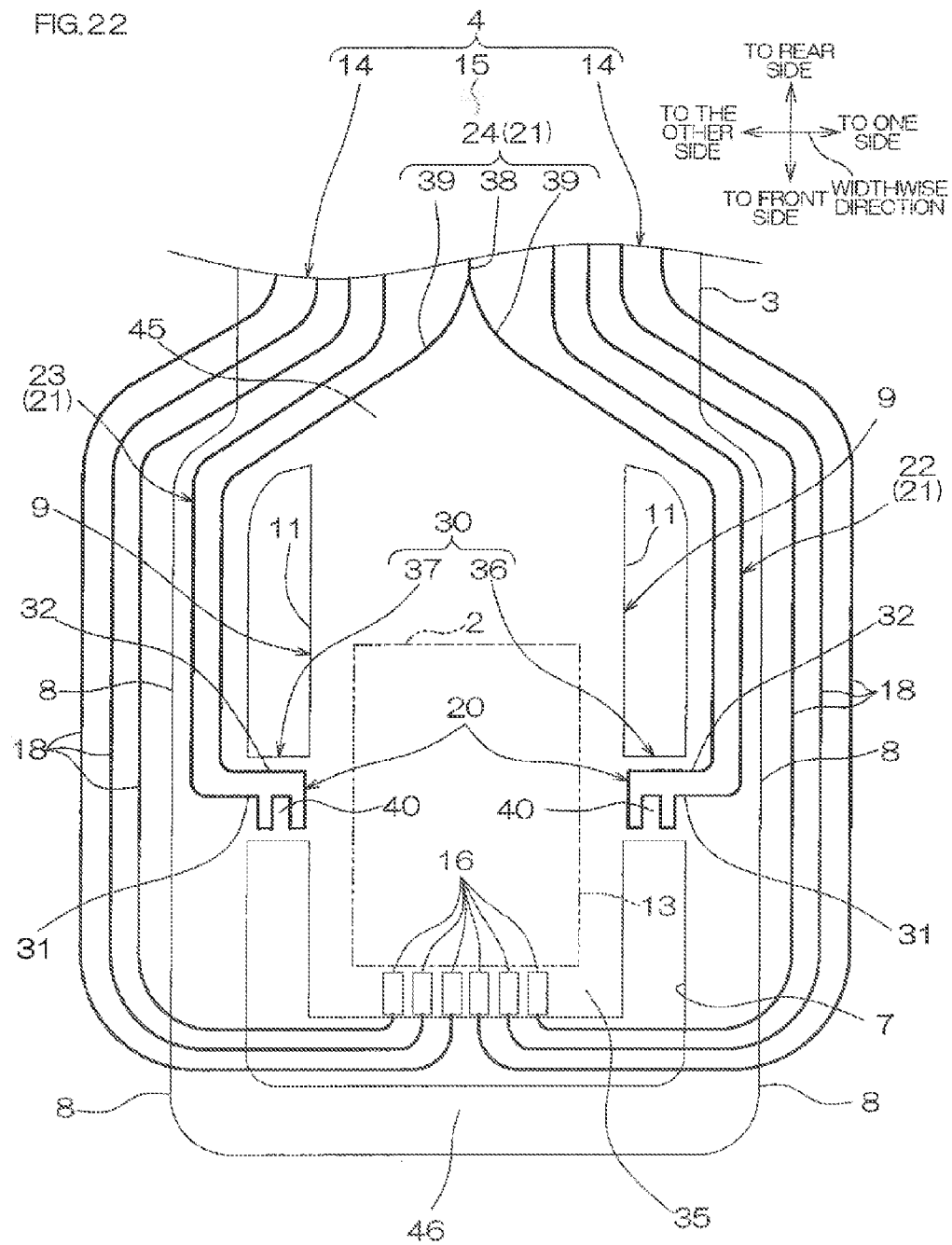
FIG. 22 shows a plan view of a gimbal portion in still another embodiment (a form in which a stage is directly supported on a rear facing portion) of the suspension board with circuit of the present invention.
Figure 23:
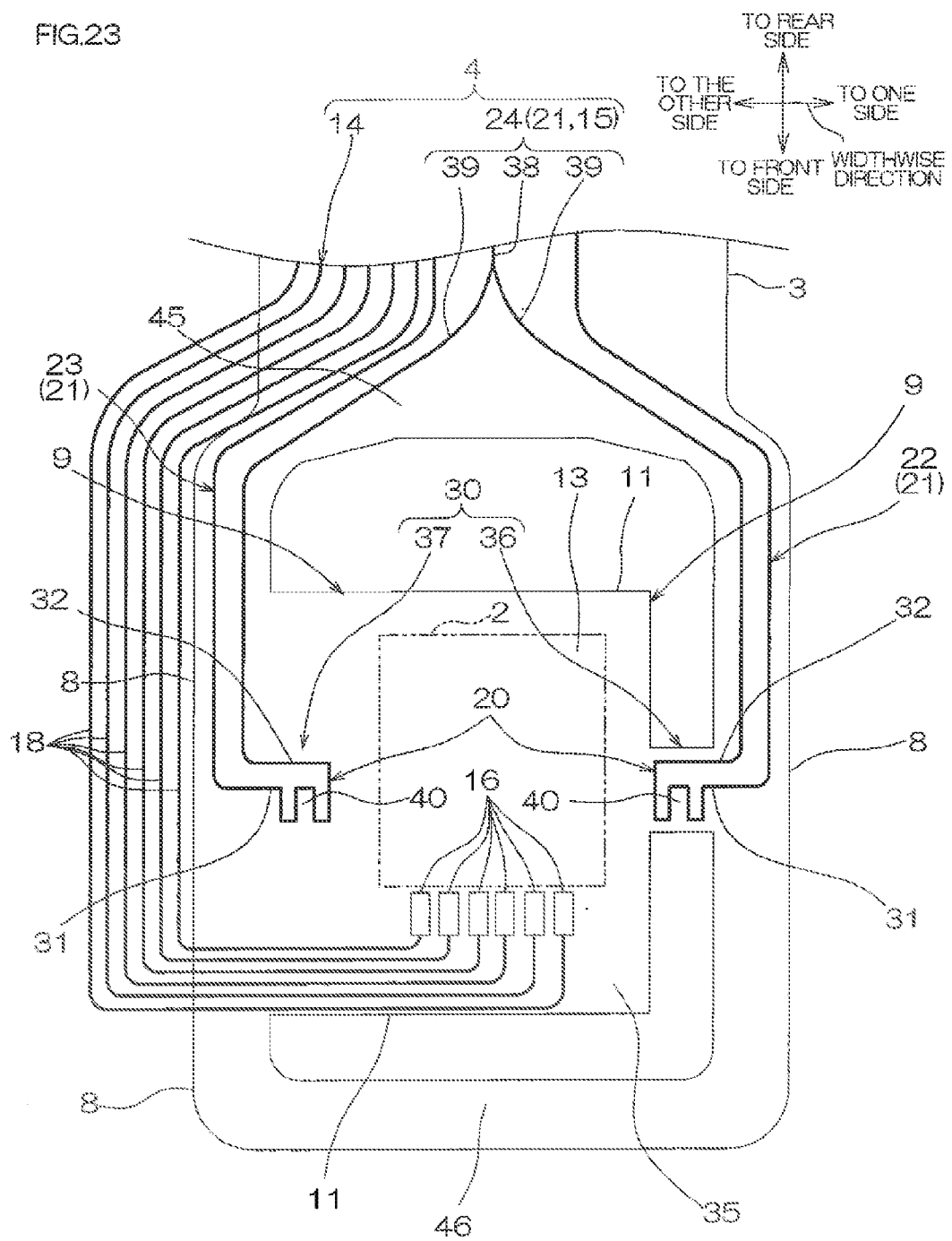
FIG. 23 shows a plan view of a gimbal portion in yet another embodiment (a form in which a stage is directly supported on outrigger portions) of the suspension board with circuit of the present invention.

FIG. 7 shows a plan view of a gimbal portion in another embodiment (a form in which a driving portion is provided in the rear end portion of a stage) of the suspension board with circuit of the present invention. FIG. 8 shows a plan view of a gimbal portion in still another embodiment (a form in which a driving portion is provided in the front end portion of a stage) of the suspension board with circuit of the present invention. FIG. 9 shows an enlarged plan view of a driving portion in yet another embodiment (a form in which a heater has a generally U-shape in plan view) of the suspension board with circuit of the present invention. FIG. 10 shows an enlarged plan view of a driving portion in still another embodiment (a form in which linear portions are arranged in parallel in the front-rear direction) of the suspension board with circuit of the present invention. FIG. 11 shows an enlarged plan view of a driving portion in yet another embodiment (a form in which eight linear portions are provided) of the suspension board with circuit of the present invention. FIG. 12 shows a cross-sectional view of still another embodiment (a form in which an expansive portion is formed of a metal supporting board and an insulating base layer) of the suspension board with circuit of the present invention. FIG. 13 shows a cross-sectional view of yet another embodiment (a form in which an expansive portion is formed of a metal supporting board) of the suspension board with circuit of the present invention. FIG. 14 shows a plan view of still another embodiment (a form in which a heater terminal includes a first heater terminal and a second heater terminal) of the suspension board with circuit of the present invention. FIG. 15 shows a cross-sectional view when the stage of the gimbal portion shown in FIG. 14 is swung. FIG. 16 shows an enlarged plan view of a first driving portion in yet another embodiment (a form in which a heater is formed of a metal supporting pattern) of the suspension board with circuit of the present invention. FIG. 17 shows a cross-sectional view of the suspension board with circuit shown in FIG. 16. FIG. 18 shows a plan view of still another embodiment (a form in which heater wires are formed together with signal wires into bundles) of the suspension board with circuit of the present invention. FIG. 19 shows a plan view of a gimbal portion in yet another embodiment (a form in which a connecting portion is connected to a rear facing portion) of the suspension board with circuit of the present invention. FIG. 20 shows a plan view of a gimbal portion in still another embodiment (a form in which a connecting portion is connected to outrigger portions) of the suspension board with circuit of the present invention. FIG. 21 shows a plan view of a gimbal portion in yet another embodiment (a form in which a stage is directly supported on a front facing portion) of the suspension board with circuit of the present invention. FIG. 22 shows a plan view of a gimbal portion in still another embodiment (a form in which a stage is directly supported on a rear facing portion) of the suspension board with circuit of the present invention. FIG. 23 shows a plan view of a gimbal portion in yet another embodiment (a form in which a stage is directly supported on outrigger portions) of the suspension board with circuit of the present invention. FIG. 24 shows a plan view of a gimbal portion in still another embodiment (a form in which a stage is directly supported on driving portions serving also as supporting portions) of the suspension board with circuit of the present invention.

Note that the members corresponding to the individual components described above are designated by the same reference numerals in each of the subsequent drawings, and a detailed description thereof is omitted.

In the embodiment of FIG. 2, the driving portions 30 are provided on both sides of the stage 11 so as to sandwich the stage 11 therebetween. However, as shown in, e.g., FIG. 7 or 8, the driving portions 30 can also be provided in parallel with the rear end portion or front end portion of the stage 11.

As shown in FIG. 7, the driving portions 30 are formed between the rear end portions of the both widthwise end portions of the stage 11 and the rear facing portion 45 so as to traverse the slit 7 in the front-rear direction.

In the gimbal portion 6, the heater wires 21 are disposed so as to obliquely frontwardly extend from the front end portion of the main body portion 5 on both widthwise sides, while one of the heater wires 21 is partly branched. After reaching the both widthwise end portions of the rear facing portion 45, the heater wires 21 then reach the both widthwise end portions of the rear end portion of the slit 7 to be subsequently curved widthwise inwardly and reach the heaters 20.

In the embodiment of FIG. 7, by driving by the first driving portion 36, one widthwise end portion of the rear end portion of the stage 11 is frontwardly moved, while the other widthwise end portion of the rear end portion of the stage 11 is swung toward the other widthwise side, as shown by the arrow.

On the other hand, in FIG. 8, the driving portions 30 are formed between the front end portions of the both widthwise end portions of the stage 11 and the front facing portion 46 so as to traverse the slit 7 in the front-rear direction.

The driving portions 30 are also disposed on the both widthwise sides of the connecting portion 12 to be spaced apart therefrom.

The signal wires 18 are disposed so as to protrude from the front end portion of the main body portion to both widthwise outsides and then extend in the front-rear direction along the pair of outrigger portions 8 on both widthwise outsides of the gimbal portion 6. Subsequently, the signal wires 18 are bent widthwise inwardly to extend widthwise inwardly along the front facing portion 46. The signal wires 18 that have extended widthwise inwardly along the front facing portion 46 are then curved rearwardly from the widthwise middle portion of the front facing portion 46 to pass through the connecting portion 12 and reach the front end portions of the head-side terminals 16.

In the gimbal portion 6, the heater wires 21 are disposed to obliquely frontwardly extend (while one of them is partly branched) from the front end portion of the main body portion 5 on both widthwise sides. After reaching the both widthwise end portions of the rear facing portion 45, the heater wires 21 then extend along the pair of outrigger portions 8. After reaching the both widthwise end portions of the front facing portion 46, the heater wires 21 are subsequently curved widthwise inwardly, widthwise traverse the slit 7, and then reach the heaters 20.

In the embodiment of FIG. 8, by driving by the first driving portion 36, one widthwise end portion of the front end portion of the stage 11 is moved rearwardly, while the other widthwise end portion of the rear end portion of the stage 11 is swung toward the other widthwise side.

Preferably, as in the embodiment of FIG. 2, the two driving portions 30 are provided on both widthwise sides of the stage 11 so as to sandwich the stage 11 therebetween.

In the embodiment of FIG. 2, the operation of widthwise swinging the stage 11 can be performed more reliably and accurately than in the embodiments of FIGS. 7 and 8.

In the embodiment of FIG. 3, the heaters 20 are provided with the meandering portions 41. However, as shown in, e.g., FIG. 9, each of the heaters 20 can also be formed into a generally U-shape (trombone wiring) in plan view including two linear portions 43 and one turn-back portion 44.

Preferably, as shown in the embodiment of FIG. 3, the heaters 20 are provided with the meandering portions 41. This allows the total length of each of the heaters 20 and the electric resistance thereof to be more reliably set in a desired range.

In the embodiment of FIG. 3, the linear portions 43 are arranged to be parallel in the widthwise direction, but the direction of parallel arrangement is not particularly limited. For example, as shown in FIG. 10, the linear portions 43 can also be arranged to be parallel in the front-rear direction.

Preferably, as in the embodiment of FIG. 3, the linear portions 43 are arranged to be parallel in the widthwise direction. In the embodiment of FIG. 3, the expansive portion 40 can be thermally expanded along the widthwise direction more efficiently than in the embodiment of FIG. 10.

In the embodiment of FIG. 3, the four linear portions 43 are provided, but the number of the linear portions 43 is not particularly limited as long as it is plural and not less than 3. For example, as shown in FIG. 11, eight linear portions can also be provided.

In the embodiment of FIG. 4, the expansive portion 40 is formed of the metal supporting board 3, the insulating base layer 28, and the insulating cover layer 29. However, for example, the expansive portion 40 can be formed of at least one of the metal supporting board 3, the insulating base layer 28, and the insulating cover layer 29.

Specifically, as shown in FIG. 12, the expansive portion 40 can be formed of the metal supporting board 3 and the insulating base layer 28. Alternatively, as shown in FIG. 13, the expansive portion 40 can also be formed of the metal supporting board 3.

According to the embodiments of FIGS. 12 and 13 also, the same function and effect achieved in the embodiment of FIG. 4 can be achieved.

In the embodiment of FIG. 1, the heater terminals 19 are formed of the first heater terminal 25, the second heater terminal 26, and the third heater terminal 27 (three heater terminals 19). However, as shown, e.g., FIG. 14, the heater terminals 19 can also be formed of the first heater terminal 25 and the second heater terminal 26 (two heater terminals 19).

In FIG. 14, the third heater wire 24 electrically connects the other end portion 32 of one of the heaters 20 and the other end portion 32 of the other heater 20. Specifically, the third heater wire 24 is disposed so as to widthwise extend along the rear facing portion 45 and be frontwardly curved at the both widthwise end portions thereof. The third heater wire 24 then extends along each of the outrigger portions 8 to be curved widthwise inwardly at the middle portion thereof in the front-rear direction and reach the other end portions 32 of the heaters 20 on both sides.

As a result, in the conductive pattern 15, a second driving circuit is formed in which the first heater terminal 25, the first heater wire 22, one of the heaters 20, the third heater wire 24, the other heater 20, the second heater wire 23, and the second heater terminal 26 are conducting electrically.

In the embodiment of FIG. 14, a current flows in the second driving circuit to thermally expand the respective expansive portions 40 of the first driving portion 36 and the second driving portions 37.

Consequently, the stage 11 is pressed (squeezed) from both sides thereof in the widthwise direction so that, to relax a pressing force, e.g., the stage 11 is deformed into an upwardly protruding warped shape, as shown in FIG. 15.

As a result, the slider 2 mounted on the upper surface of the mounting region 13 of the stage 11 is upwardly swung around the widthwise middle portion of the rear end portion of the connecting portion 12.

In the embodiment of FIGS. 3 and 4, the heaters 20 are formed as the second conductive patterns 15. However, as shown in, e.g., FIGS. 16 and 17, the heaters 20 can also be formed as, e.g., a metal supporting pattern 47.

As shown in FIGS. 16 and 17, at the center of the first driving portion 36, the metal supporting board 3 has a support opening 48 extending therethrough in the thickness direction. The support opening 48 is formed in a generally rectangular shape in bottom view which is slightly smaller than the first driving portion 36.

The metal supporting pattern 47 is provided in the support opening 48 to have the same shape as that of the heater 20 of FIG. 3 when projected in the thickness direction.

The insulating base layer 28 has base openings 49 which are formed in the portions thereof each corresponding to one widthwise end portion of the metal supporting pattern 47 to extend therethrough in the thickness direction.

The base openings 49 are filled with the end portions of the heater wires 22 (the first heater wire 22 and the third heater wire 24) which are connected to the both end portions of the metal supporting pattern 47.

Each of the expansive portions 40 includes the insulating base layer 28 and the insulating cover layer 29.

The embodiment of FIG. 16 can achieve the same function and effect as achieved by the embodiment of FIG. 10.

As shown in FIG. 18, the heater wires 21 can also be disposed together with the signal lines 18 in bundles.

The heater wires 21 are disposed to protrude from the front end portion of the main body portion 5 to both outsides and extend in the front-rear direction together with the pair of outrigger portions 8 on both widthwise outsides of the gimbal portion 6 and along the signal wires 18. Thereafter, the heater wires 12 are bent widthwise inwardly to subsequently reach the heaters 20 of the driving portions 30.

By the embodiment of FIG. 18 also, the same function and effect achieived by the embodiment of FIG. 14 can be achieved.

In the embodiment of FIG. 2, the connecting portion 12 is connected to the front facing portion 46. However, as shown in, e.g., FIG. 19, the connecting portion 12 can also be connected to the rear facing portion 45 or can also be connected to the one outrigger portion 8, as shown in FIG. 20.

The embodiments of FIGS. 19 and 20 can also achieve the same function and effect as achieved by the embodiment of FIG. 2.

In the embodiment of FIG. 2, the front facing portion 46 is caused to support the stage 11 via the connecting portion 12. However, as shown in, e.g., FIG. 21, it is also possible to cause the front facing portion 46 to directly support the stage 11 without interposition of the connecting portion 12 therebetween.

By the embodiment of FIG. 21 also, the same function and effect as achieved by the embodiment of FIG. 2 can be achieved.

In the embodiment of FIG. 19, the rear facing portion 45 is caused to support the stage 11 via the connecting portion 12. However, as shown in, e.g., FIG. 22, it is also possible to cause the rear facing portion 45 to support the stage 11 without interposition of the connecting portion 12 therebetween.

By the embodiment of FIG. 22 also, the same function and effect as achieved by the embodiment of FIG. 19 can be achieved.

In the embodiment of FIG. 20, the one outrigger portion 8 is caused to support the stage 11 via the connecting portion 12. However, as shown in FIG. 23, it is also possible to cause the one outrigger portion 8 to support the stage 11 without interposition of the connecting portion 12.

By the embodiment of FIG. 23 also, the same function and effect as achieved by the embodiment of FIG. 20 can be achieved.

In the embodiment of FIG. 2, the front facing portion 46 is caused to support the stage 11 using the connecting portion 12. However, as shown in, e.g., FIG. 24, it is also possible to cause the pair of outrigger portions 8 to support the stage 11 using the driving portions 30.

In FIG. 24, the driving portions 30 function also as supporting portions.

By the embodiment of FIG. 24 also, the same function and effect as achieved by the embodiment of FIG. 2 can be achieved.

While the illustrative embodiments of the present invention are provided in the above description, such is for illustrative purpose only and it is not to be construed limitative. Modification and variation of the present invention which will be obvious to those skilled in the art is to be covered by the following claims.

What is claimed is:

1. A suspension board with circuit, comprising:
 a mounting portion for mounting thereon a slider;
 a supporting portion, which is connected to the mounting portion, for supporting one end portion of the mounting portion;
 a facing portion which faces the mounting portion and is spaced apart therefrom; and
 a driving portion provided between and connected to the mounting portion and the facing portion,
 wherein the driving portion includes:
  a heater; and
  an expansive portion which is thermally expanded by heat generated from the heater.

2. A suspension board with circuit according to claim 1, wherein
 the facing portion includes two facing portions, and
 the driving portion further includes:
 a first driving portion provided between one of the facing portions and the mounting portion; and
 a second driving portion provided between the other facing portion and the mounting portion.

3. A suspension board with circuit according to claim 2, further comprising:
 a first driving circuit for selectively driving either one of the first driving portion and the second driving portion.

4. A suspension board with circuit according to claim 3, further comprising:
 a second driving circuit for driving both of the first driving portion and the second driving portion.

5. A suspension board with circuit according to claim 1, wherein the heater is formed in a meandering shape.

* * * * *